(12) United States Patent
Ogura

(10) Patent No.: US 8,515,188 B2
(45) Date of Patent: Aug. 20, 2013

(54) IMAGE PROCESSING APPARATUS

(75) Inventor: Keigo Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 13/019,133

(22) Filed: Feb. 1, 2011

(65) Prior Publication Data
US 2011/0188747 A1  Aug. 4, 2011

(30) Foreign Application Priority Data
Feb. 4, 2010 (JP) .................................. 2010-023200

(51) Int. Cl.
G06K 9/36 (2006.01)
(52) U.S. Cl.
USPC ......................................... 382/232
(58) Field of Classification Search
USPC ................................. 382/232–253
See application file for complete search history.

(56) References Cited

U.S. PATENT DOCUMENTS
5,237,397 A * 8/1993 Mighdoll et al. ........ 375/240.25
2003/0043905 A1   3/2003 Nakayama
2007/0098283 A1 * 5/2007 Kim et al. .................... 382/239

FOREIGN PATENT DOCUMENTS
JP 2003-069835 A  3/2003
JP 2006-229688 A  8/2006
JP 2008-042681 A  2/2008

* cited by examiner

Primary Examiner — Alex Liew
(74) Attorney, Agent, or Firm — Canon USA Inc. IP Division

(57) ABSTRACT

An image processing apparatus for performing image coding by lossless and lossy compression units, including an image coding pre-determination unit configured to perform a determination to select either one of the lossless and the lossy compression units in coding pre-processing of an image, a data analysis unit configured to determine whether a color number for a pixel block of the image is single, and a coding unit configured to, when it is determined by the data analysis unit that the color number is not single, perform coding on the pixel block with the coding unit determined by the image coding pre-determination unit, and when it is determined by the data analysis unit that the color number is single, perform coding with a coding unit whose determination result made by the image coding pre-determination unit is changed based on an operation state of the lossless and the lossy compression units.

5 Claims, 25 Drawing Sheets

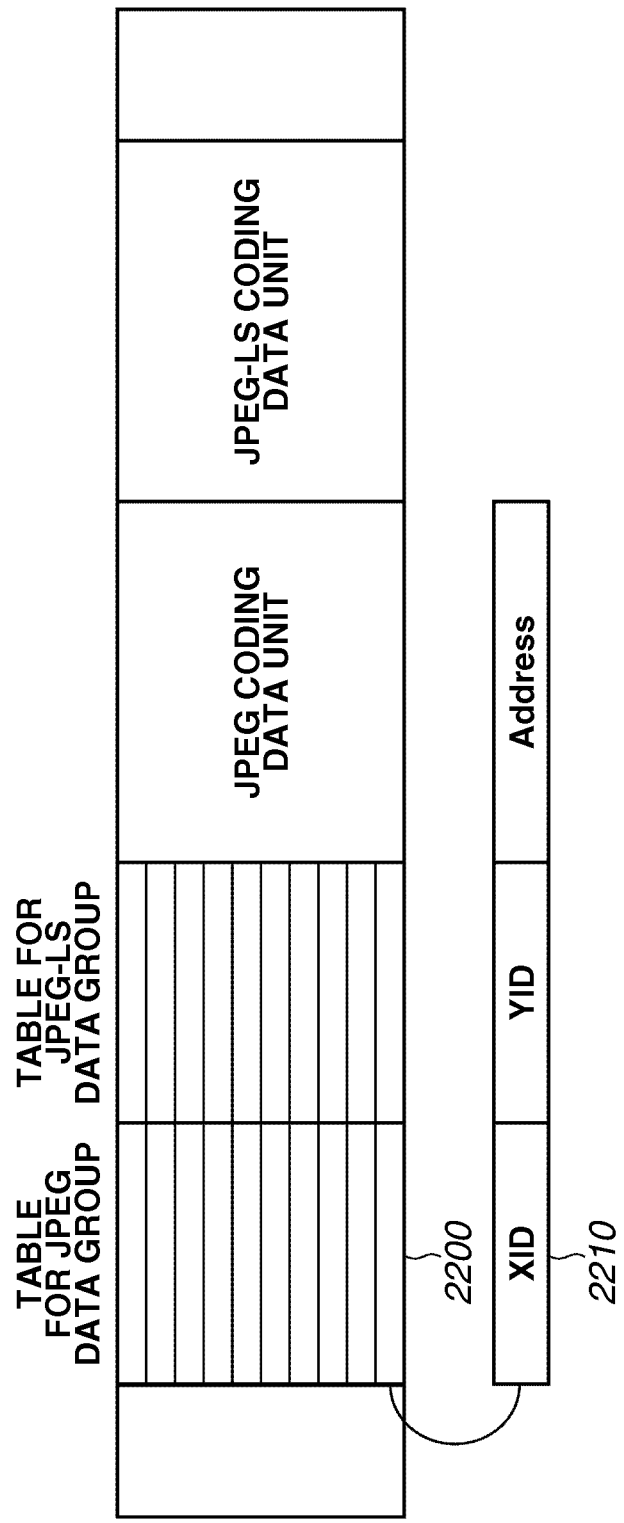

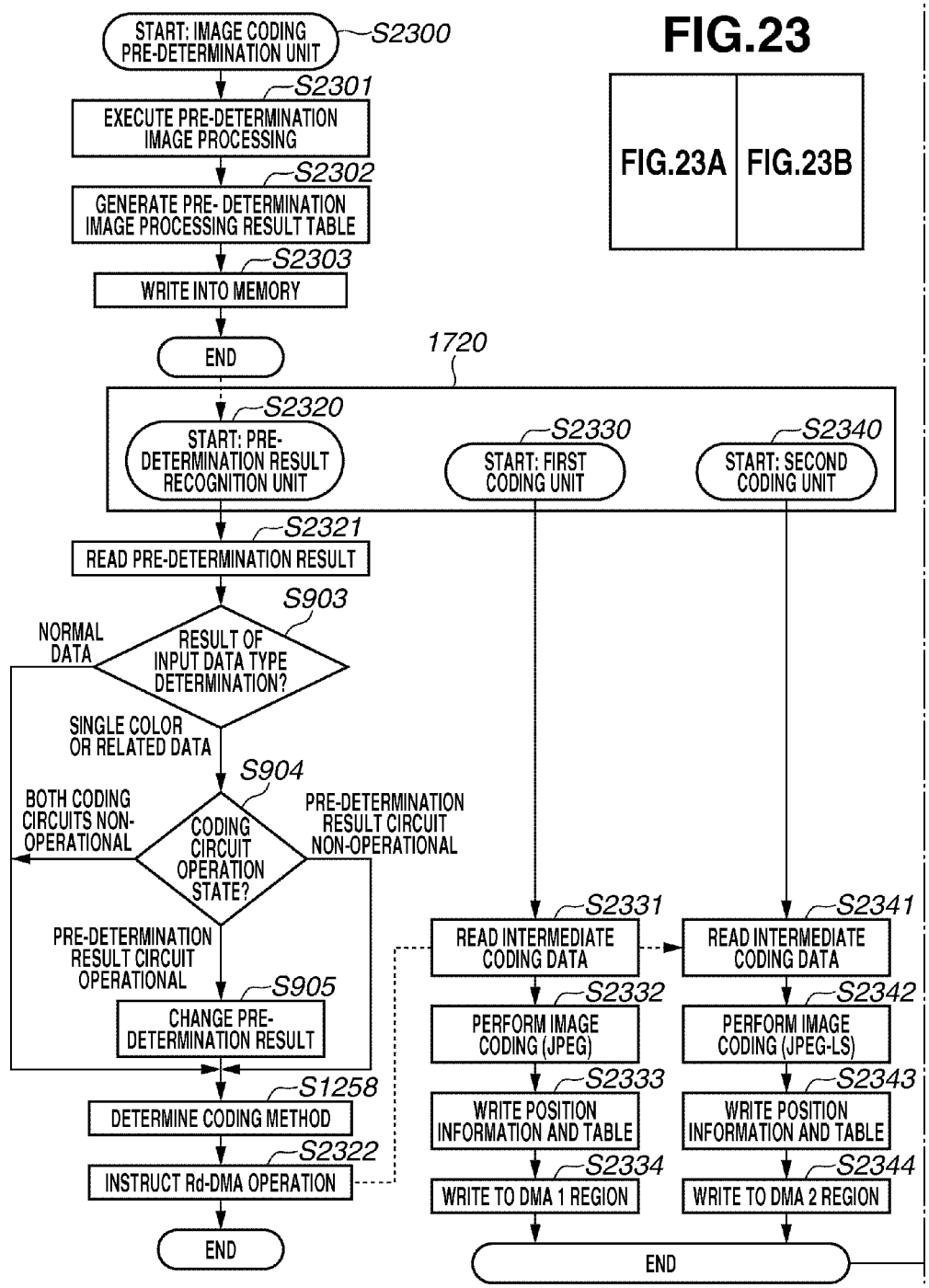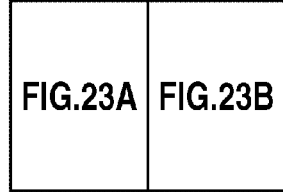

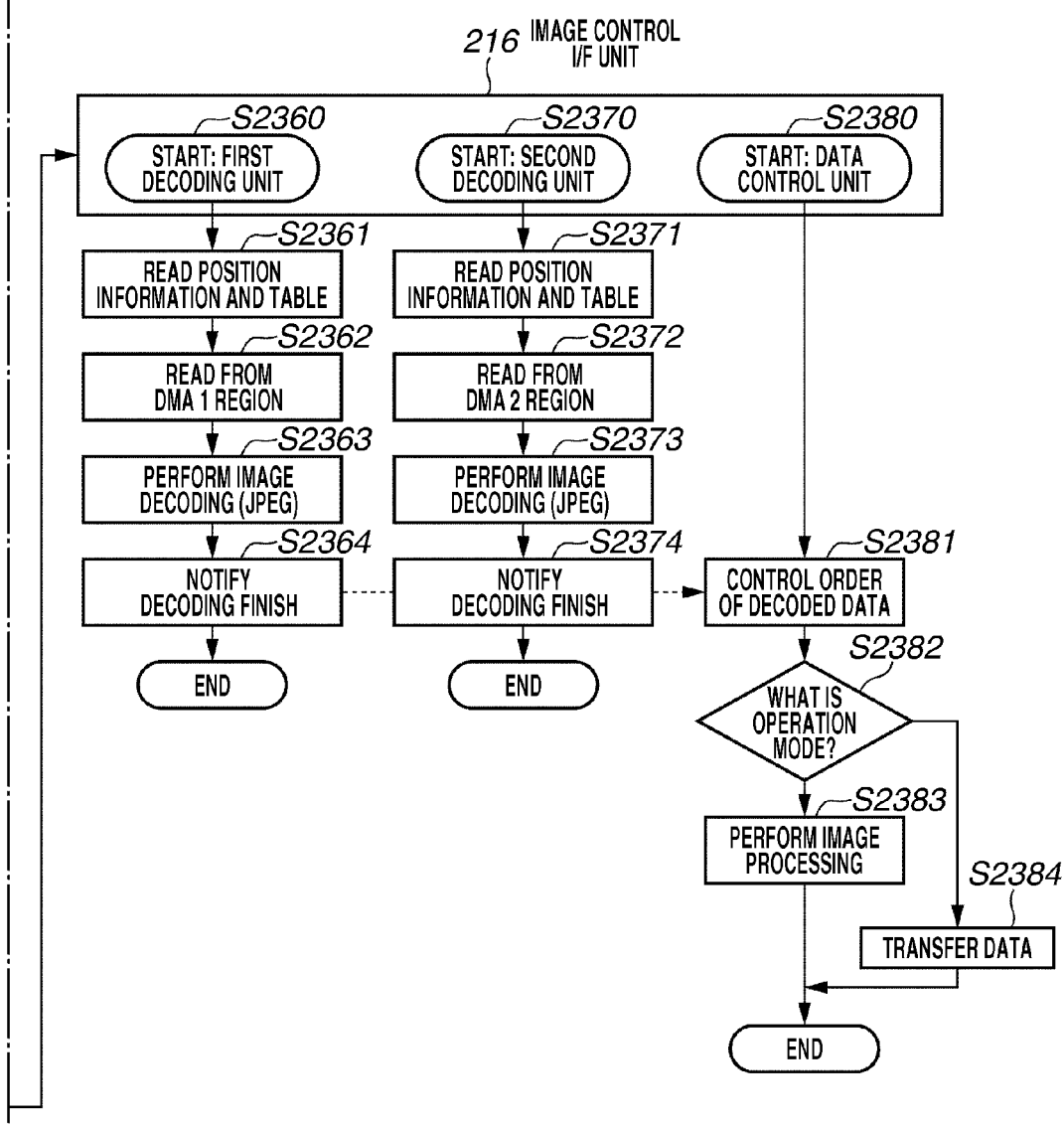

US 8,515,188 B2

IMAGE PROCESSING APPARATUS

BACKGROUND OF THE INVENTION

1. Field of the Invention

The present invention relates to an image processing apparatus.

2. Description of the Related Art

Recently, to increase the speed of image formation in an electrophotographic method color image processing apparatus (hereinafter, an "MFP" (multifunction peripheral)) and to improve image quality, in an MFP system, it has become necessary to transfer data that exceeds several hundred Mbytes (megabytes), to a memory such as a dynamic random access memory (DRAM).

The amount of data that a memory such as a DRAM can transfer in a fixed period is limited. Trying to transfer a large amount of data may exceed the DRAM's data transfer capability, so that the performance which the MFP requires cannot be satisfied.

Conventionally, to ensure that the DRAM data transfer capability is not exceeded, the amount of data to be transferred to the DRAM is reduced by coding a raster image of about 600 dpi obtained after rasterizing scanner data or page description language (PDL) data. However, to reduce the amount of data by image coding, coding methods such as lossy compression, represented by Joint Photographic Experts Group (JPEG) compression, in which the image is not completely returned to its original state, were mainstream.

Subsequently, a method was proposed that combined a lossless compression method, represented by JPEG-LS, and a lossy compression image coding method. Thus, Japanese Patent Application Laid-Open No. 2003-69835 realizes a high printing performance by reducing the amount of data in the system by combining the characteristics of a lossy compression method (JPEG) and a lossless compression method (JPEG-LS). When lossless and lossy compression methods are combined, the target image is simultaneously subjected to two coding methods, and the data from the method that has the smaller coded data amount is selected. At this point, the coded data that was not selected is automatically discarded.

Lossless compression methods have continued to evolve, and have now reached the stage where, as discussed in Japanese Patent Application Laid-Open No. 2006-229688, for example, image coding can be performed after determining in advance whether a lossless compression method or a lossy compression method should be used to generate intermediate compression data. Further, by employing the method discussed in Japanese Patent Application Laid-Open No. 2008-42681, two coding circuits can operate individually, thereby obviating the need to discard unused coded data.

In Japanese Patent Application Laid-Open No. 2006-229688, several pixels are grouped into a block in advance, and that block is used as a coded data region by collecting the original image data of the coded data region. A determination is then made regarding whether the pixel information for the coded data region is a picture image represented by a natural image, or a graphic image represented by a computer graphic. Based on the determined result, image coding is performed by an image coding circuit like that discussed in Japanese Patent Application Laid-Open No. 2006-229688.

Thus, the technique used in Japanese Patent Application Laid-Open No. 2006-229688 requires two types of circuit, a lossless compression circuit and a lossy compression circuit. Coding can be performed by determining in advance whether lossless compression or lossy compression is more appropriate, and operating one of the two kinds of compression circuit.

However, in Japanese Patent Application Laid-Open No. 2006-229688, if there is a succession of coded data groups for which lossless compression is appropriate, one of the two coding circuit types comes to a complete standstill. Accordingly, an improvement in performance may not be obtained even if the two types of coding circuit are configured in parallel. Consequently, even if the image coding method is determined in advance, an increase in system speed may not be obtained.

SUMMARY OF THE INVENTION

The present invention is directed to improving both image coding performance and system performance.

According to an aspect of the present invention, an image processing apparatus for performing image coding by a lossless compression unit and a lossy compression unit includes an image coding pre-determination unit configured to perform a determination to select either one of the lossless compression unit and the lossy compression unit in coding pre-processing of an image, a data analysis unit configured to determine whether a color number for a pixel block of the image is single, and a coding unit configured to, when it is determined by the data analysis unit that the color number is not single, perform coding on the pixel block with the coding unit determined by the image coding pre-determination unit, and when it is determined by the data analysis unit that the color number is single, perform coding with a coding unit whose determination result made by the image coding pre-determination unit is changed based on an operation state of the lossless compression unit and the lossy compression unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 22 illustrates a RAM storage format of a coded data table and coded data in a high-speed system according to an exemplary embodiment of the present invention.

FIG. 23, which includes FIGS. 23A and 23B, is a flowchart illustrating an operational relationship among an image coding pre-determination unit, an image coding unit, and an image decoding unit in a high-speed system according to an exemplary embodiment of the present invention.

DESCRIPTION OF THE EMBODIMENTS

Various exemplary embodiments, features, and aspects of the invention will be described below with reference to the drawings.

An exemplary embodiment according to the present invention will now be described using the drawings.

Figure 1:
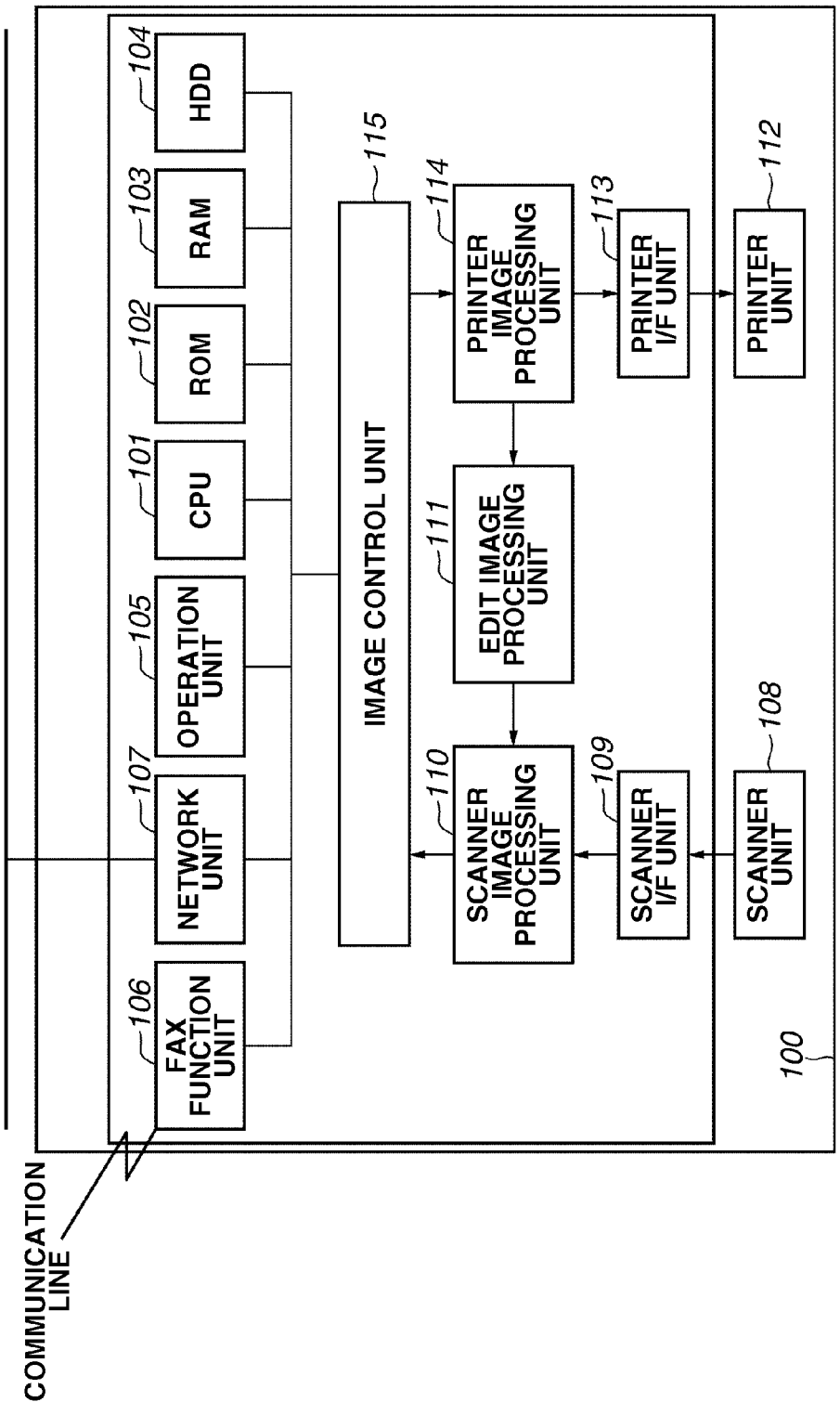
FIG. 1 illustrates an MFP configuration according to an exemplary embodiment of the present invention.

FIG. 1 is a block diagram illustrating a multifunction peripheral (MFP) 100 to which the image processing apparatus according to the present exemplary embodiment can be applied. The MFP 100 illustrated in the present exemplary embodiment combines the functions of a fax, a printer, and a copying machine, and performs color image data processing.

The overall configuration of the MFP 100 according to the present exemplary embodiment will now be described using the block diagram illustrated in FIG. 1. A central processing unit (CPU) 101 controls all of the functions in the MFP 100, for example, the function of an image input/output apparatus such as a scanner unit 108 and a printer unit 112, an image processing unit, and a communication function unit. A read-only memory (ROM 102) stores an MFP operation program.

A random access memory (RAM) 103 is utilized as a work area for MFP operation, and is used to store image data. A hard disk drive (HDD) 104 is utilized for temporary storage of a software program to be executed by the CPU 101, as well as storage of image data, page description language (PDL) data, scan data, and pre-output print data that was transferred from another device (not illustrated) or that is to be transferred to another device. An operation unit 105 displays an MFP state and setting information to a user, and transfers an operation command from the user to the CPU 101.

An image control unit 115 has a function for controlling the transfer of data in the MFP system to the optimum location. Examples of the data that is controlled may include the below-described scan, print, PDL, and fax data.

A fax function unit 106 can store a fax image received via a communication line in the HDD 104 in the MFP, and transfer the fax image received via the communication line to another device via a network 107 for printing.

A printer unit 112 generates print data based on PDL data transferred from another device via the network unit 107.

The scanner unit 108 is an image read apparatus which generates image data by reading an image. The scanner unit 108 includes a lens which collects light reflected from a document, a charge-coupled device (CCD) sensor which inputs and converts reflected light into an electric signal, an analog signal processing unit, a analog/digital conversion unit and the like (these units are not illustrated). The scanner unit 108 outputs the generated image data to a scanner interface (I/F) unit 109. The scanner I/F 109 receives image data input from the scanner unit 108. A scanner image processing unit 110 performs various scanner image processing, such as spatial filter processing and input color space conversion, on the image data received by the scanner I/F 109.

An edit image processing unit 111 includes a plurality of image process (IP) function units for performing various image processing, such as color space conversion, resolution conversion, binarization, and rotation.

The printer unit 112 is a printer apparatus such as a laser beam printer and a light-emitting diode (LED) printer. If the printer unit 112 is a laser beam printer, it is configured of, for example, an exposure control unit that includes a semiconductor laser, an image forming unit, and a transfer sheet conveyance control unit (these units are not illustrated). A printer image processing unit 114 performs printer image processing, such as image area (object) processing and zooming, on the image data output from the respective image processing units (110, 111, and 114). Further, the printer image processing unit 114 can also combine the image data into page image data, and output the resultant data to the printer unit 112. A printer I/F 113 outputs the print data based on a timing requested by the printer unit 112.

The printer unit 112 forms an image on a print medium based on image data output from the scanner I/F unit 109. Operation instructions to the scanner unit 108, the scanner I/F unit 109, the printer I/F unit 113, and the printer unit 112 can be sent by the CPU 101 via each image processing unit (110, 111, and 114).

Figure 2:
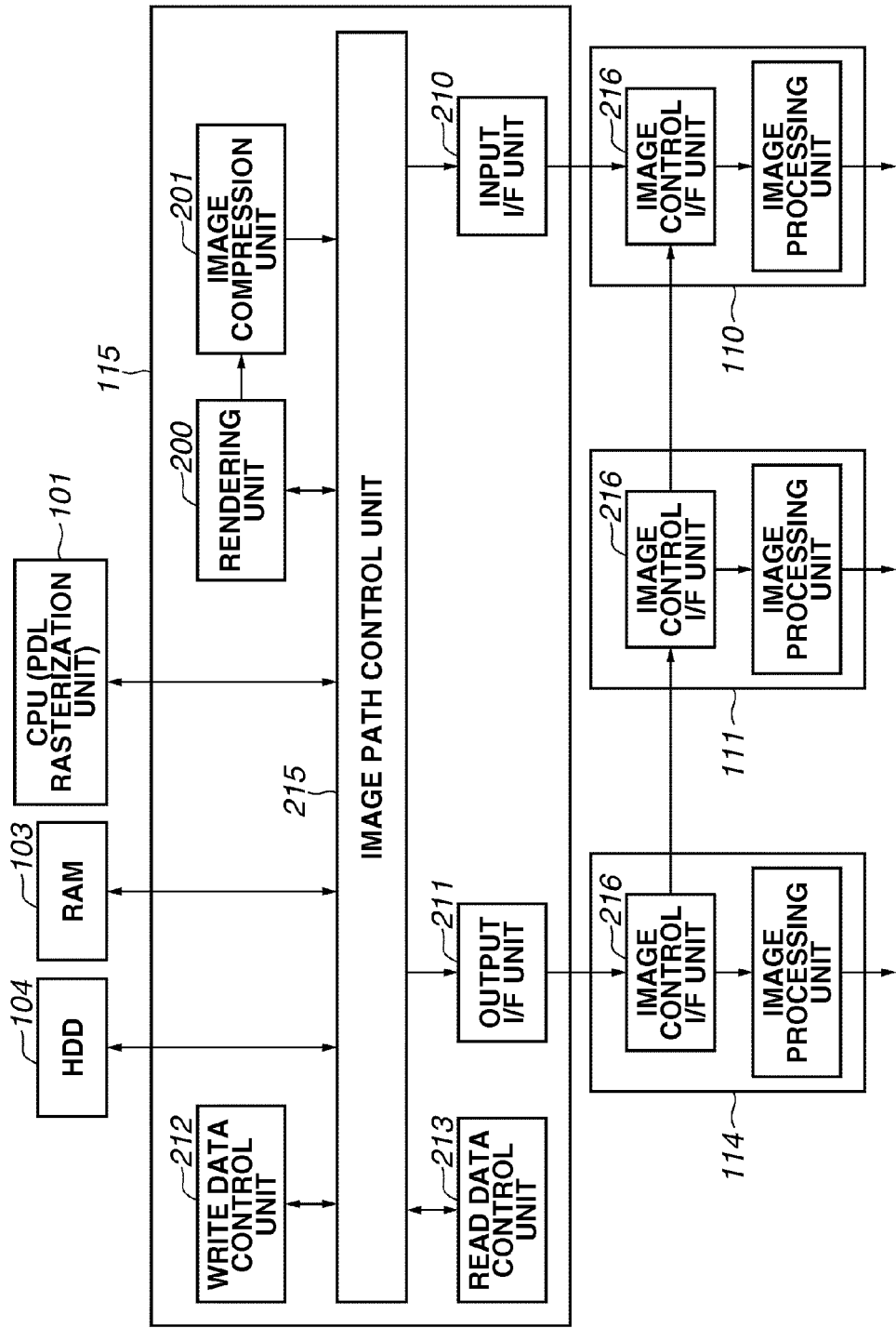
FIG. 2 illustrates an image control unit according to an exemplary embodiment of the present invention.

Next, an image control unit 115 which has a connection to the block configuration in the MFP illustrated in FIG. 1 will be described in more detail using FIG. 2. This description will be based on a coding circuit for compression of a PDL print image. The coding circuit in the present exemplary embodiment may also be placed in the scanner image processing unit 110.

An image path control unit 215 determines the destination of data transferred from not only the CPU 101, the RAM 103, and the HDD 104, but also from each of the blocks in the image control unit 115, the scanner, and the printer. Below, a PDL print system will be used for the description.

The CPU 101 in the MFP receives PDL data rasterized by a host computer from the network unit 107, and stores the received PDL data in the HDD 104. Subsequently, the CPU 101 rasterizes the PDL data into a display list, which is an intermediate language for a rendering unit 200 to rasterize, and writes the display list into the RAM 103. When the display list is rasterized in the RAM 103, the CPU 101 issues an instruction to the rendering unit 200 to start rendering. While rasterizing the display list into a raster image, the rendering unit 200 transfers the raster image to an image compression unit 201. At the image compression unit 201, the below-described image coding, such as Joint Photographic Experts Group (JPEG) and JPEG-Lossless (JPEG-LS) compression, is performed on the raster image. A plurality of coded data is then gathered, provided with identification information as a header, and formed into a packet format. The packet-format data is rasterized in the HDD 104 or the RAM 103 by a write data control unit 212 or a read data control unit 213. Further, the image that has been coded and formed into packets can be transferred via an output I/F unit 211 and then via an image control I/F unit 216 in the printer image processing unit 114 to the edit image processing unit 111, where it may be subjected to image processing such as color space conversion, resolution conversion, binarization, and rotation. In addition, the result of the image processing performed by the edit image processing unit 111 may be returned to the image path control unit 215 from the scanner image processing unit 110 via an input I/F unit 210, and again rasterized in the RAM 103 or the HDD 104.

Figure 3:
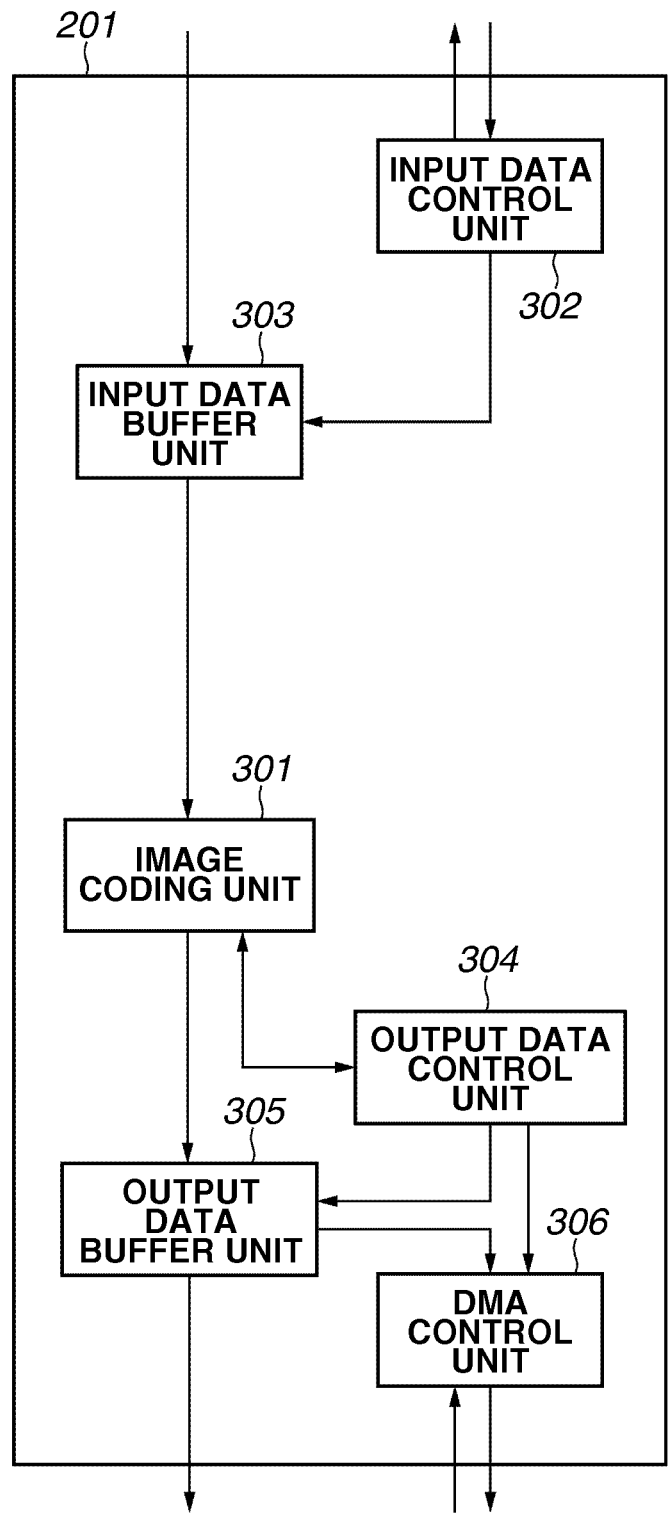
FIG. 3 illustrates an image compression unit according to an exemplary embodiment of the present invention.

FIG. 3 illustrates the image compression unit 201. The image compression unit 201 includes an input data control unit 302, an input data buffer unit 303, an image coding unit 301, an output data control unit 304, an output data buffer unit 305, and a DMA control unit 306.

The input data control unit 302 controls the reception of an input raster image, and writes the input raster image into the input data buffer unit 303. In this example, 32×32 pixel data is written as one packet unit into the input data buffer unit 303. The input data is grouped into 16 blocks of 8×8 pixels or 4 blocks of 16×16 pixels, and then image coding is performed on each coded data group by the image coding unit 301. Subsequently, the coded data is stored in the output data buffer unit 305 while the output data control unit 304 generates header information representing a coordinate position, the coding method, or a data characteristic in the packet, from the coded data. Then, along with the coded data, the header information is controlled by the direct memory access (DMA) control unit 306, and transferred to the RAM 103 or the HDD 104, and the respective image processing units.

Figure 4:
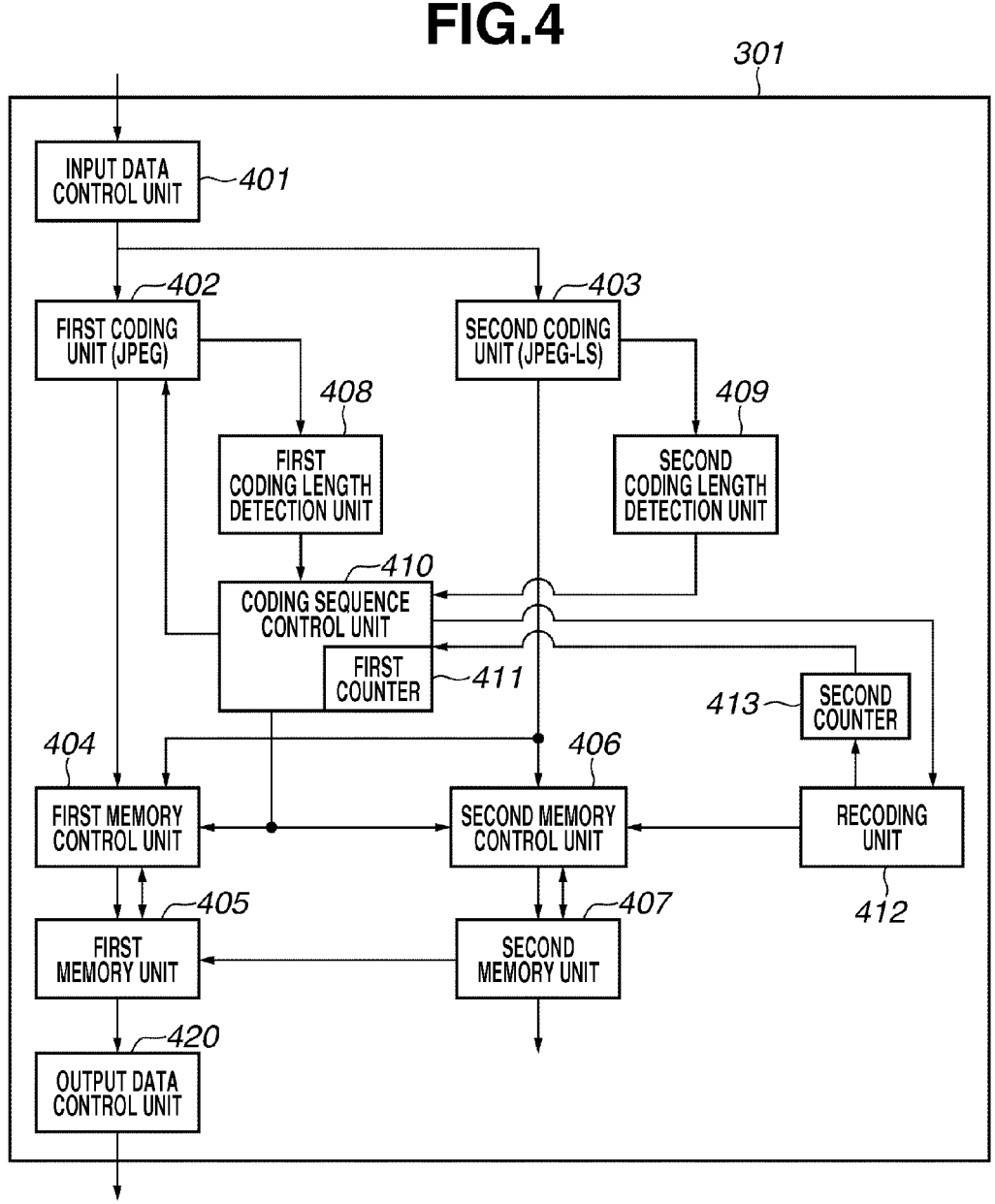
FIG. 4 illustrates an image coding unit according to an exemplary embodiment of the present invention.

FIG. 4 illustrates in detail the image coding unit 301. A first coding unit 402 is a lossy compression unit, in which image data corresponding to a pixel block unit input from an input control unit 401 is directly converted based on a parameter that affects the compression rate. Subsequently, Huffman coding processing is performed by performing quantization using a quantization step. The factor that affects the amount of coded data generated here is the quantization step. This quantization step is set by a coding sequence control unit 410 as the parameter that affects the compression rate. JPEG compression is known as a technique that is suited to natural images.

The coding sequence control unit 410 includes quantization matrix tables Q0, Q1, and Q2, which are used when quantizing a frequency coefficient after a discrete cosine transform (DCT). These quantization matrix tables Q0, Q1, and Q2 indicate the quantization step value. The greater the quantization step value, the narrower the possible range for the frequency coefficient after quantization, and the compression rate is improved.

Unlike the first coding unit 402, the second coding unit 403 is a lossless coding unit. Therefore, the decoding result is the same as the image prior to coding, so that in principle there is no deterioration in image quality. In the present exemplary embodiment, JPEG-LS is used for this second coding unit 403. JPEG-LS is completely different from the JPEG algorithm. A characteristic of JPEG-LS compression is that it is a technique suited to computer graphics. When coding an image by JPEG-LS compression, it is possible to generate even coded data less than the relatively small quantization step value, such as the quantization steps 1, 2, and 3, which are employed in the lossy JPEG compression.

A first coding length detection unit 408 performs coding at essentially the same timing and on the same pixel block as the first coding unit 402, and outputs coded data to which an identification bit is added indicating that coding was performed by the first coding unit. Further, during the output of the coded data, the second coding unit 403 adds an identification bit to the head of that coded data indicating that coding was performed by the second coding unit 403.

A second coding length detection unit 409 detects the length of the coded data for a one pixel block amount (including the one bit of the identification bit) output from the second coding unit 403, and outputs the detected length to the coding sequence control unit 410.

The coding sequence control unit 410 controls the coding processing units. The coding sequence control unit 410 is provided with a first counter 411. This counter is reset when coding for one page is started. The first counter 411 compares the coding length data from the first coding length detection unit 408 with the coding length data from the second coding length detection unit 409, selects the shorter coding length data, and cumulatively adds the data. Further, since the shorter coding length is revealed, the coding sequence control unit 410 issues a request to a first memory control unit 404 to store the coded data having the shorter coding length.

Based on control from the coding sequence control unit 410, the first memory control unit 404 writes the coded data into a first memory 405, and deletes the overwritten data. The first memory 405 stores the coded data that was finally confirmed when the coding of one page was completed as coded data to be output to the HDD 104, for example.

Based on control from the coding sequence control unit 410, a second memory control unit 406 stores coded data generated by the second coding unit 403 in a second memory 407, and reads the coded data from the second memory 407. This second memory 407 is used as a work area during the coding of one page of image data.

A recoding unit 412 recodes coded data in a range specified by the coding sequence control unit 410 from among the coded data (lossless compression data) stored in the second memory 407.

Since the coded data coded by the second coding unit (JPEG-LS compression unit) 403 is stored in the second memory 407, first, this coded data is decoded (restored) into the pixel blocks of the original image by a JPEG-LS decompression unit (not illustrated) provided in the recoding unit 412. Then, the first coding unit 402 (JPEG compression unit) performs JPEG compression (lossy compression) on the restored pixel blocks based on the quantization matrix table set by the coding sequence control unit 410. Next, the coding sequence control unit 410 selects the lossy compression data output from the JPEG compression unit or the lossless compression data prior to the recoding, whichever is smaller, and outputs the selected data. This processing is repeatedly executed for a range specified by the coding sequence control unit 410. A second counter 413 is reset when the recoding of the recoding unit 412 is started. The second counter 413 cumulatively counts the amount of coded data generated by the recoding unit 412. When the recoding of the set range is completed, the value stored in the second counter (the amount of coded data generated by recoding) is output to the coding sequence control unit 410.

Figure 5:
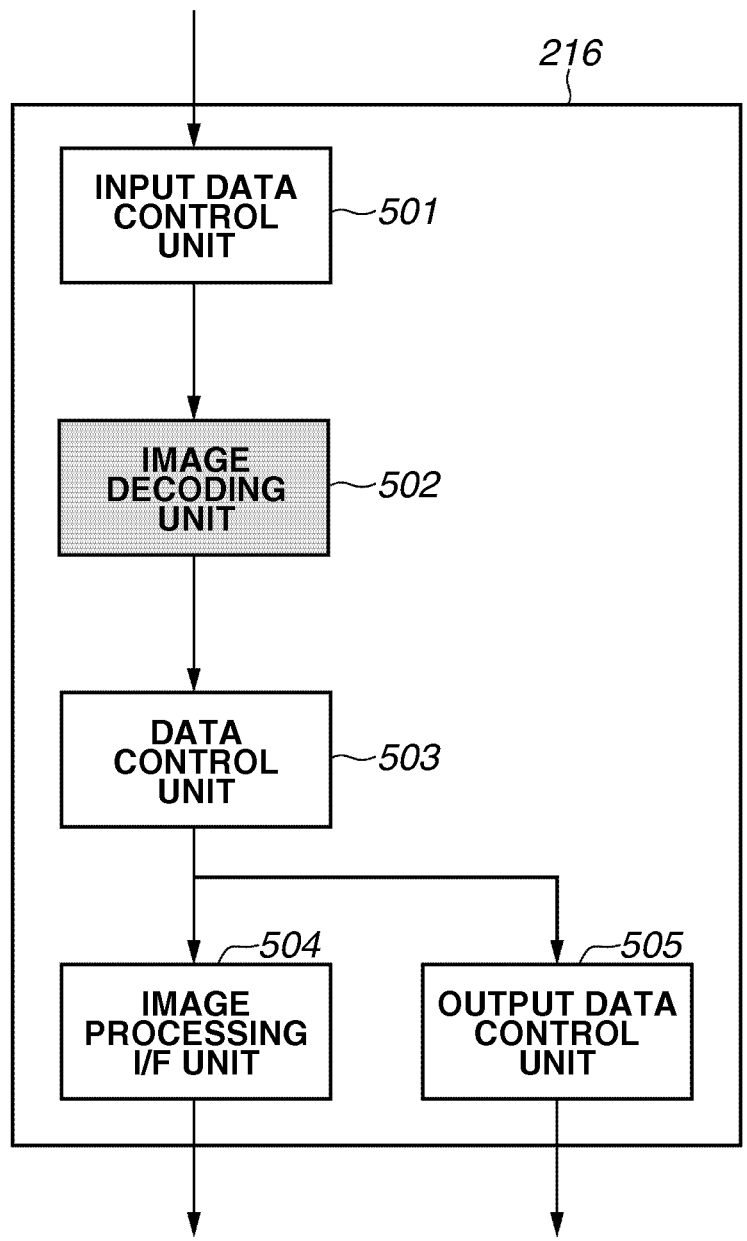
FIG. 5 illustrates an image control I/F unit according to an exemplary embodiment of the present invention.

Next, using FIG. 5, the image control I/F unit 216 for the respective image processing units (110, 111, and 114) will be described. The image control I/F unit 216 includes an input data control unit 501, an image decoding unit 502, a data control unit 503, an image processing I/F unit 504, an output data control unit 505.

The raster image is coded based on a JPEG or JPEG-LS algorithm). The resultant data is output from the image control unit 115, and received by the input data control unit 501. The input data control unit 501 receives the packet header information, and inputs the coded data to the image decoding unit 502. The image decoding unit 502 includes a decoder having a JPEG or JPEG-LS algorithm, and performs image decompression based on the compression method. The data control unit 503 includes a buffer that can store the raster data blocks on which image decompression was performed. In addition, based on an instruction from the CPU 101, the data control unit 503 can also perform printer image processing via the image processing I/F unit 504 and transfer data to another other image processing unit via the output data control unit 505. Further, in the edit image processing unit 111, the output data control unit 505 may include an image compression unit 201, so that an image which has undergone image processing can be recoded and the resultant data is transferred to the image control unit 115, the RAM 103, or the HDD 104.

Figure 6:
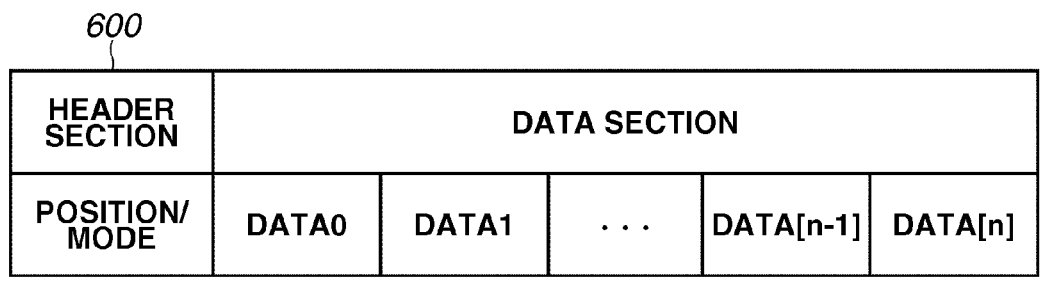
FIG. 6 illustrates a packet data configuration according to an exemplary embodiment of the present invention.

Next, the data that is processed by the above-described image compression unit 201 and rasterized in the RAM 103 or the HDD 104 will be described. FIG. 6 illustrates a packet data configuration 600. This data is formed from a header portion and a data portion. Information such as position information about the image data corresponding to the subject packet in the compression target image, and the type and coding method of the image, is written in the header portion. Coded encode data and decoded raster data are arranged in the data portion. For example, for a packet formed by JPEG compression, if the packet size is 32×32 pixels, 16 pieces of compression data can be taken together as one packet for an 8×8 pixel coding unit. Since JPEG data has an end code, even if a plurality of pieces of compression data is linked, as long as the end code can be recognized on the reading side, the data can be formed as one packet. Conversely, for JPEG-LS, offset address information may be described in the header portion so that a plurality of compression units can be grouped together.

Figure 7:
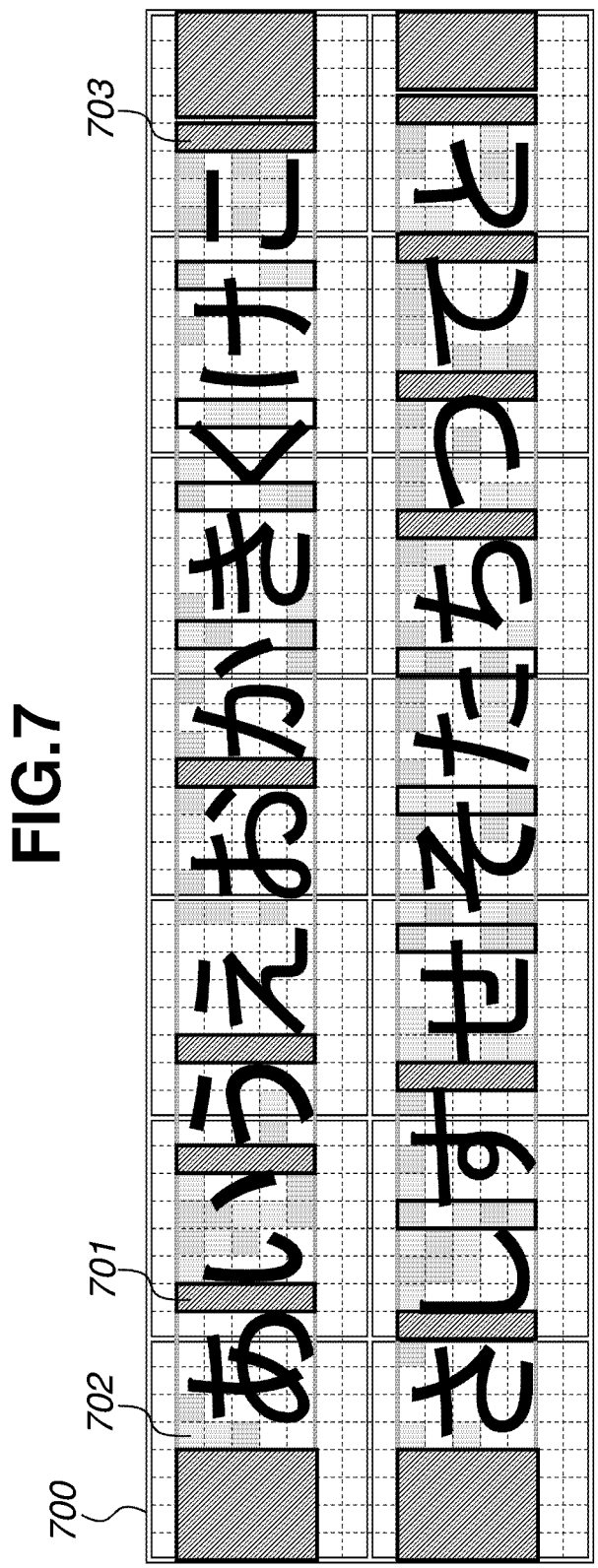
FIG. 7 illustrates an example of an office document according to an exemplary embodiment of the present invention.
Figure 8:
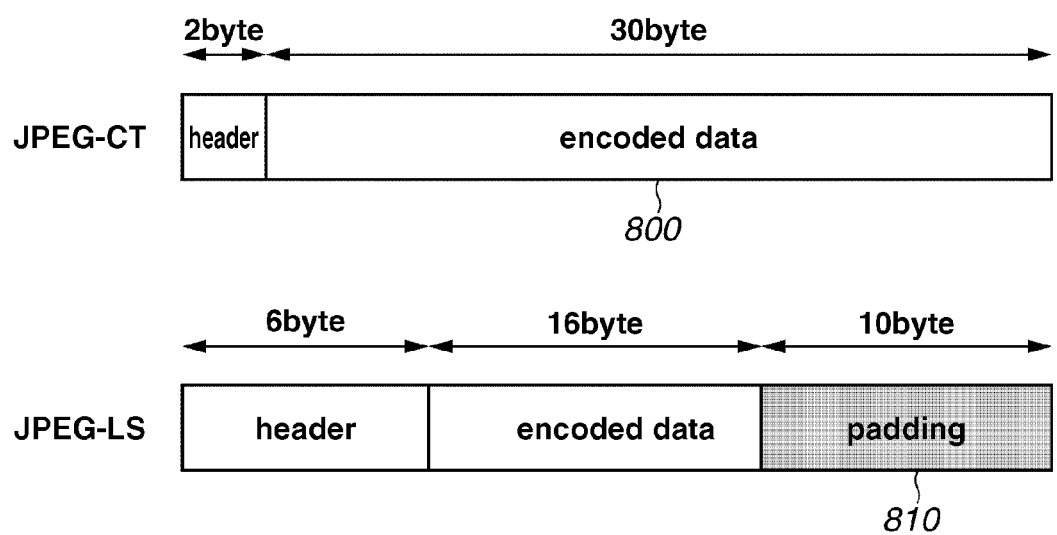
FIG. 8 illustrates a packet data amount for single-color data according to an exemplary embodiment of the present invention.

Next, using FIGS. 7 and 8, determination of the two compression methods for an actual document will be described. FIG. 7 is an expanded view of a part of an office document 700 produced by a word processor. Each frame 702 represents a 1 mm×1 mm square (about 32×32 pixels) when a 600 dpi document is produced. At this point, a white pixel data group 701 (hatched portion) of about five frames exists between each character. Further, at either end of the document, a white pixel portion 703 (hatched portion) exists. FIG. 8 illustrates a data configuration when such a packet expressed by a single color is turned into data. The packet data of JPEG-DCT 800 is formed from a 2 byte header and 30 bytes of encode data. For JPEG-LS 810, 22 bytes are required since a header is 6 bytes and an encode data part is 16 bytes. However, practically, considering memory access, 32 bytes could be used as single-color packet minimum data for both JPEG-DCT and JPEG-LS with 10 bytes padding. Further, depending on the data used for the background, a document produced from the slide illustrated in the below-described FIG. 14 can have almost the same characteristics.

Figure 9:
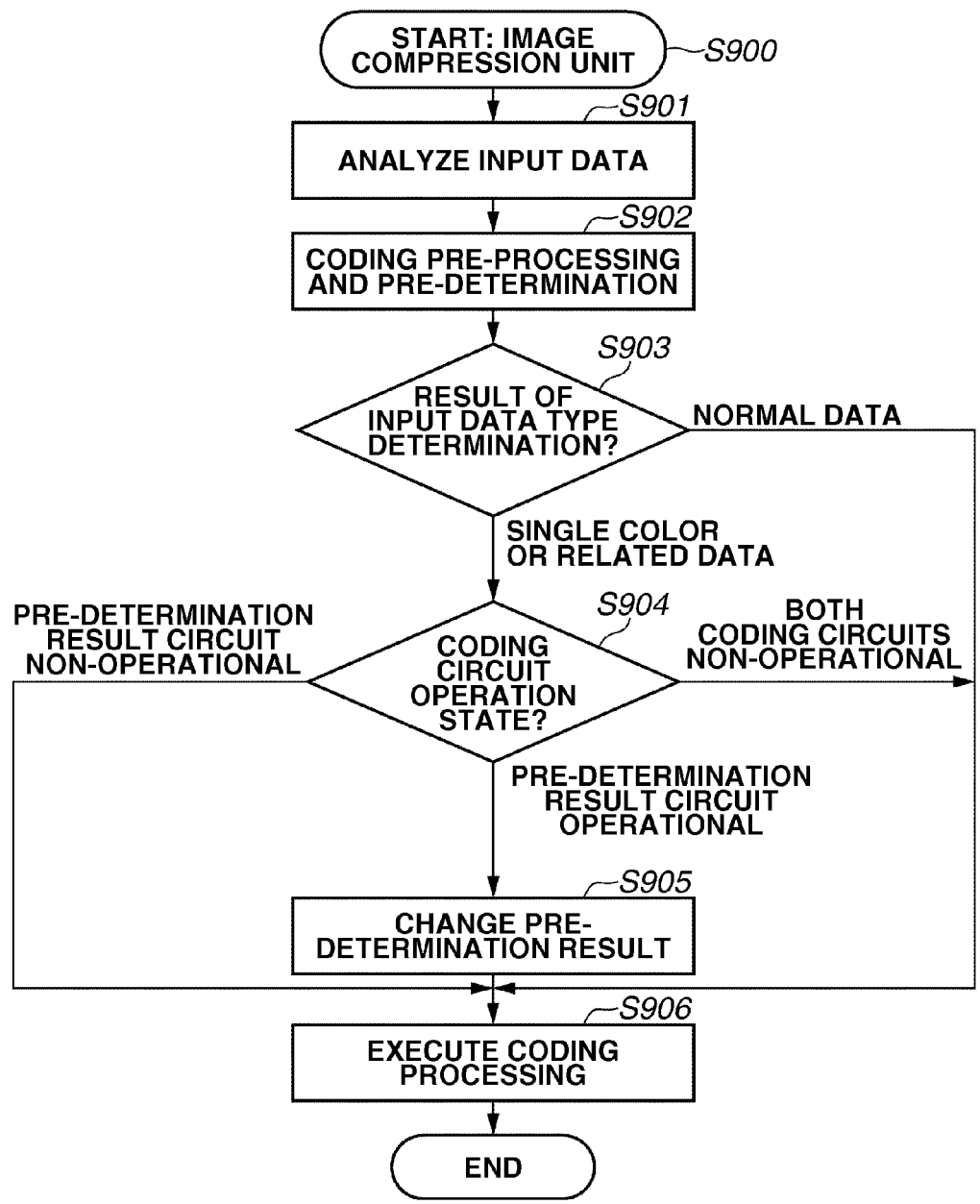
FIG. 9 illustrates an overall operational flow of an image compression unit according to an exemplary embodiment of the present invention.

Therefore, based on such a document characteristic and the characteristic of the coding method determination algorithm performed in coding pre-processing, the period during which the JPEG and JPEG-LS circuits can be simultaneously operated is increased by performing the control flow of the image compression unit 201 as illustrated in FIG. 9. First, in step S901, the image compression unit 201 determines a characteristic of the input raster data. Here, it is determined whether a pixel block (e.g., 32×32 pixels) is a single color. Next, in step S902, the image compression unit 201 performs coding pre-processing, and determines the compression method. Then, in step S903, based on the determination result in step S901, the image compression unit 201 determines whether the data is normal data that is not a single color, or is a data group formed from a single color (or a color number or color difference in conformity thereto). A "color number or color difference in conformity to the single color" is, for example, a predetermined threshold of colors (e.g., two colors) in which the color difference between those two colors is 3 or less for each RGB component or has a Δ of 3 or less. If it is determined in step S903 that the data is normal data, the processing proceeds to step S906.

In step S906, the image compression unit 201 executes coding processing based on the coding (circuit) method determined by the coding pre-processing. If it is determined in step S903 that the data is single-color data, the processing proceeds to step S904. In step S904, the image compression unit 201 confirms the operation state of the coding circuit that was used to code the previous raster data block. At this point, in step S904, if it is determined that the circuit for the coding method determined by the coding pre-processing (step S902) was in a non-operational state for the coding of the previous raster data block, or that both methods were in a non-operational state, the processing proceeds to step S906. Then, in step S906, the image compression unit 201 executes coding processing as is, based on the coding processing method determined by the coding pre-processing. However, in step S904, if it is determined that the circuit for the coding method determined by the coding pre-processing (step S902) is in an operational state, the processing proceeds to step S905. In step S905, the image compression unit 201 changes the coding method to the method different from the determination result in the coding pre-processing (step S902). For example, if it was determined in advance in the coding pre-processing (step S902) to be JPEG compression, and the JPEG circuit was operating during the coding of the previous raster data block, the image compression unit 201 switches to the JPEG-LS circuit, and then executes the coding processing (step S906). At this point, no matter which coding method is selected, the quality of the decoded image can be maintained, and the two coding circuits can be simultaneously operated.

Figure 24:
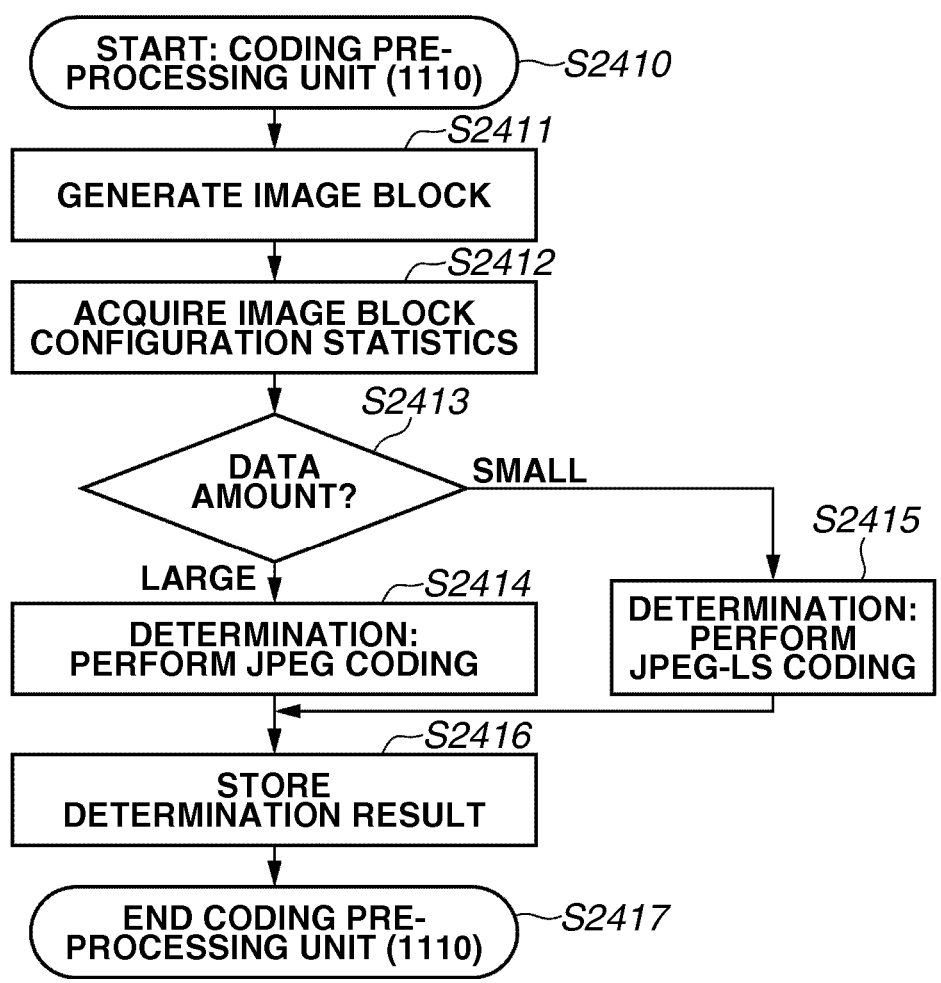
FIG. 24 illustrates a coding pre-processing unit according to an exemplary embodiment of the present invention.

Next, as the pre-processing for determining the compression method (performed by the below-described coding pre-processing unit 1110), an example of a flow for determining the coding method will be described using FIG. 24. For example, in step S2411, the coding pre-processing unit 1110 splits the minimum unit for the image coding of 32×32 pixels further into units of 2×2 pixels. The 2×2 pixels may be configured such that all four pixels have a different color, or configured of three kinds of color, two kinds of color, or a single kind of color. Then, in step S2412, the coding pre-processing unit 1110 determines which pixel configuration each block has, and stores the result. In step S2413, based on the result from step S2412, the coding pre-processing unit 1110 determines whether the data amount is large or small. In step S2414, the coding pre-processing unit 1110 determines that for cases in which all four pixels have a different color or the pixels are configured of three kinds of color, the larger the number of pixel blocks, the larger the data amount, and thus determines that such an image is a picture image. On the other hand, if there tends to be a large number of pixels configured of two kinds of color or a single kind of color, in step S2415, the coding pre-processing unit 1110 determines that it is highly likely that the character portion is a single-color packet. In step S2416, the coding pre-processing unit 1110 sets a determination threshold for the above-described image configuration, and stores the determination result concerning whether JPEG compression or JPEG-LS compression is to be performed. The determination condition of the data amount used in step S2416 to determine whether to perform JPEG or JPEG-LS compression can be set for the 32×32 pixels of the image configured of the above-described four kinds of 2×2 pixels. For example, if there are only a few pixel blocks in the 32×32 pixels in which all four pixels are different, the determination to perform JPEG-LS compression can be made.

Figure 10:
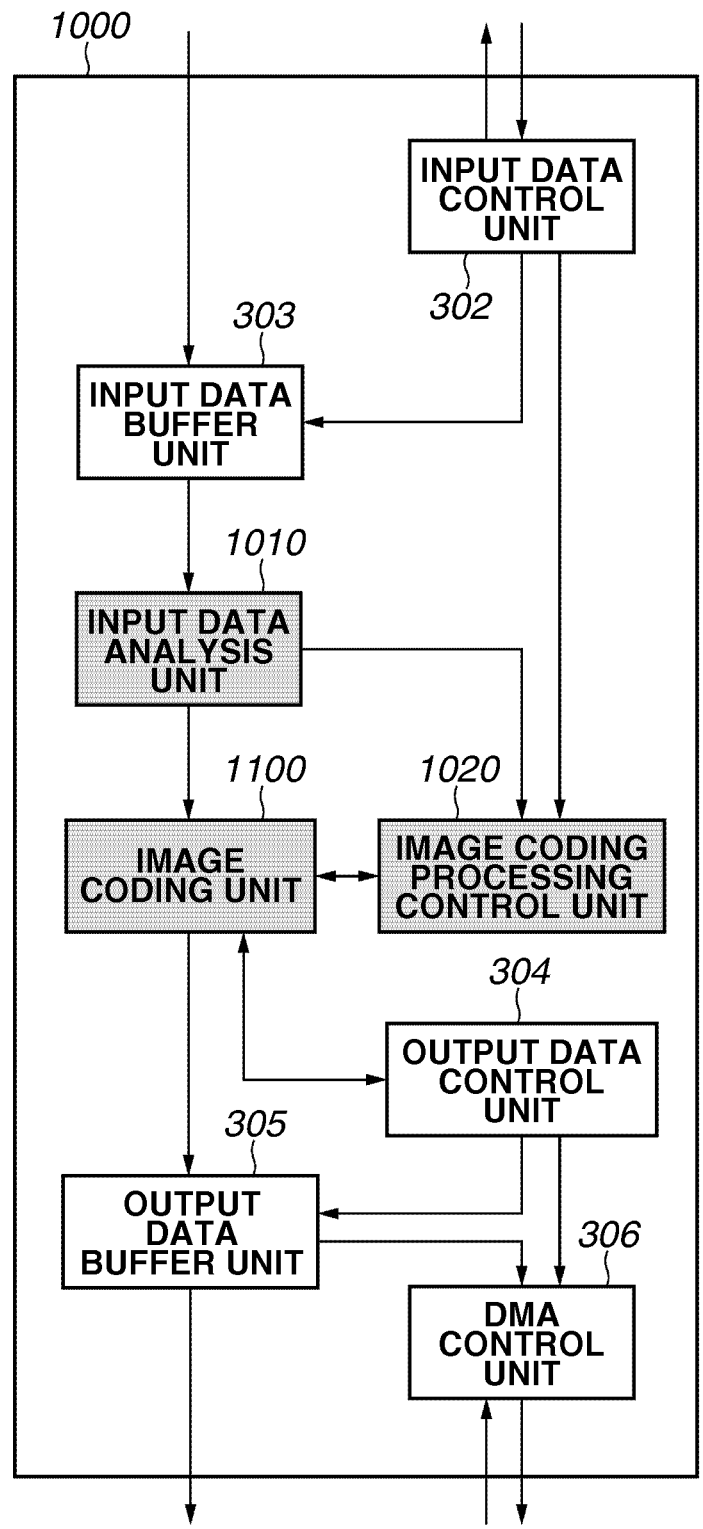
FIG. 10 illustrates an image compression unit according to a first exemplary embodiment of the present invention.
Figure 11:
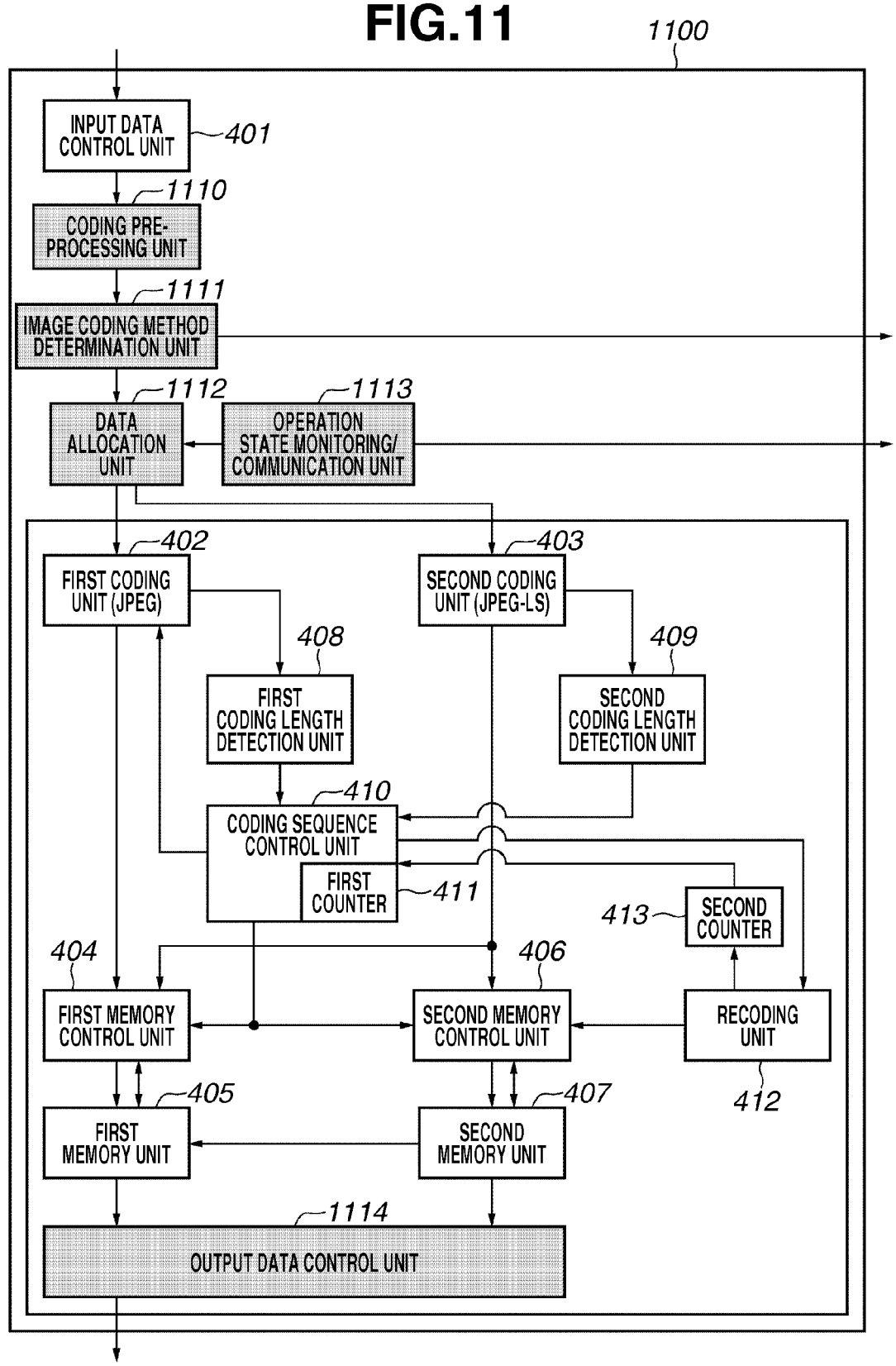
FIG. 11 illustrates an image coding unit according to a first exemplary embodiment of the present invention.

Next, to realize this method, a part of the configuration of the image compression unit 201 and the image coding unit 301 will be changed as illustrated in FIGS. 10 and 11. FIG. 10 illustrates an image compression unit 1000 corresponding to the method according to the first exemplary embodiment. An input data analysis unit 1010 and an image coding processing control unit 1020 are added between the input data buffer unit 303 and an image coding unit 1100. The input data analysis unit 1010 determines the pixel configuration of a pixel block by performing the above-described step S901. More specifically, the input data analysis unit 1010 determines whether the data is formed from a single color or not. Alternatively, the input data analysis unit 1010 may determine whether the data is related to a single color based on, for example, a condition preset in a not-illustrated register in the image coding unit 1100, or based on a color number or a flag condition. The image coding processing control unit 1020 performs the processing for, in step S902, communicating with the image coding unit 1100, acquiring a coding circuit operation state, and performing coding pre-processing. Then, in step S904, based on the coding pre-processing result, the image coding processing control unit 1020 determines whether to change the coding method.

As illustrated in FIG. 11, to the image coding unit 1100, further a coding pre-processing unit 1110, an image coding method determination unit 1111, a data allocation unit 1112, and an operation state monitoring/communication unit 1113 are added. In addition, the image coding unit 1100 changes an output data control unit 1114. The coding pre-processing unit 1110 performs the processing of step S902, and the image coding method determination unit 1111 performs the processing of step S903. The operation state monitoring/communication unit 1113 notifies the image coding processing control unit 1020 of the coding circuit operation state, and inputs data contained in the data allocation unit 1112 into either one of the coding circuits. On the other hand, the output data control unit 1114 controls the output from the two independently-operating coding circuit types based on an image order.

Figure 12:
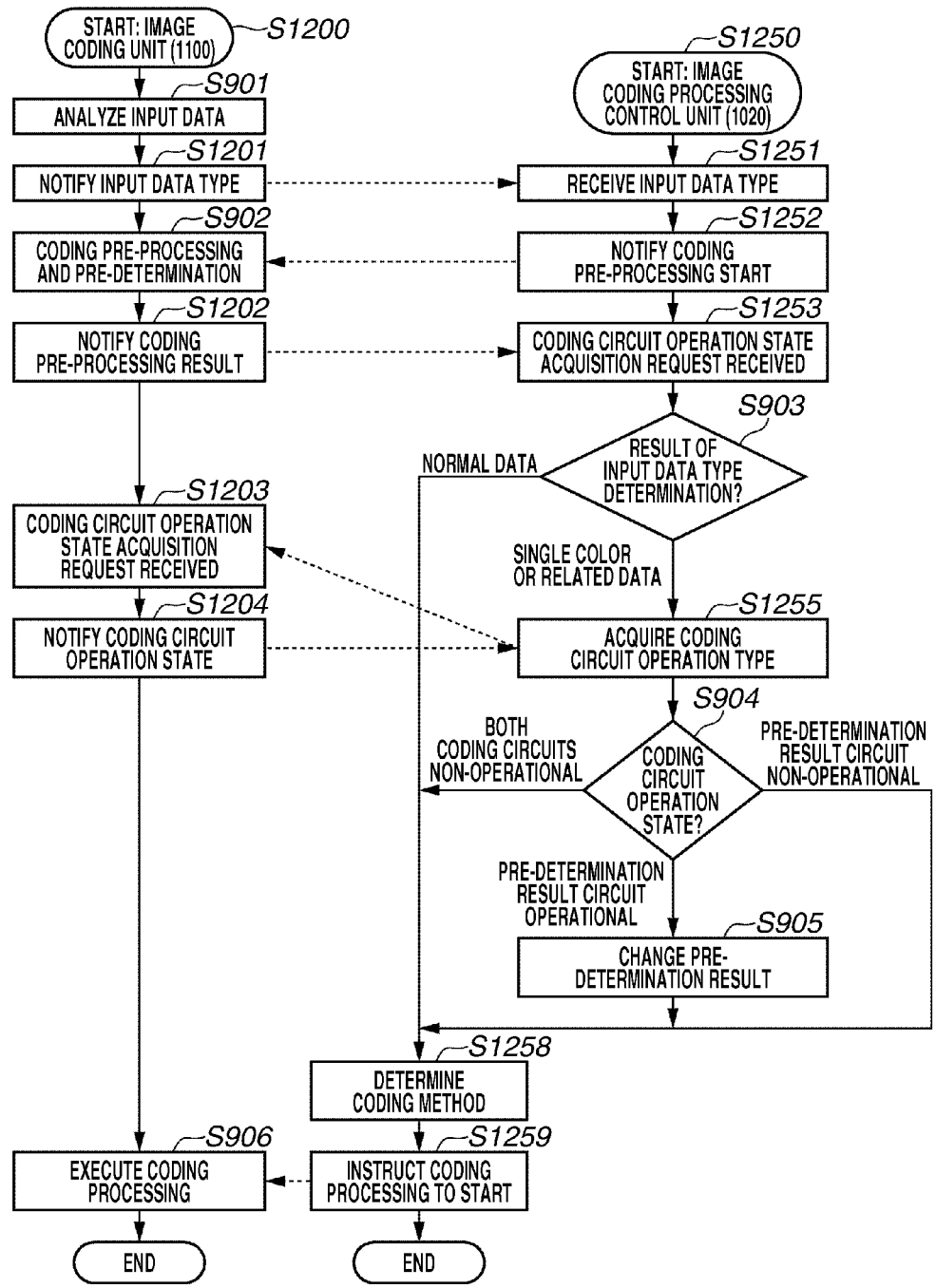
FIG. 12 is a flow diagram illustrating an operational control relationship between an image coding unit and an image coding processing control unit according to an exemplary embodiment of the present invention.

The processing of this configuration will now be described in more detail based on the processing flow of the whole image compression unit illustrated in FIG. 9 using the image coding unit 1100 and the image coding processing control unit 1020 illustrated in FIG. 12. In step S901, the image coding unit 1100 analyzes the input data. In step S1201, based on the analysis result, the image coding unit 1100 notifies the image coding processing control unit 1020 of the input data type. In step S1251, the image coding processing control unit 1020 receives the input data type. In step S1252, the image coding processing control unit 1020 notifies the image coding unit 1100 of an instruction to start coding pre-processing. In step S902, the image coding unit 1100 completes the coding pre-processing. In step S1202, the image coding unit 1100 again notifies the image coding processing control unit 1020 of that result. Then, in step S1253, the image coding processing control unit 1020 receives the coding pre-processing result. Next, in step S903, the image coding processing control unit 1020 confirms the determination result of the input data type. In step S1255, similarly to the above, for a single-color pixel block, the image coding processing control unit 1020 acquires the coding circuit operation state. Then, in step S1203, the image coding unit 1100 receives a request to acquire the coding circuit operation state. In step S1204, the image coding unit 1100 notifies the image coding processing control unit 1020 of the coding circuit operation state. In step S1258, the image coding processing control unit 1020 receives the operation state, determines the coding circuit operation state, changes the coding pre-determination result based on the method described in steps S904 and S905, and determines the coding method. Once the coding method is determined, in step S1259, the image coding processing control unit 1020 issues an instruction to start coding, and the image coding unit 1100 can then start coding processing.

In this description, the determination of the operation state of the coding circuits was based only on "whether the circuit is operating". However, the more detailed conditions for switching the pre-determination result may be set by providing a unit for notifying as its state a finish prediction cycle up to coding finish.

Next, referring to FIGS. 13 to 17, the effects of increasing the speed of image data compression according to the present exemplary embodiment will be described using timing charts.

Figure 13:
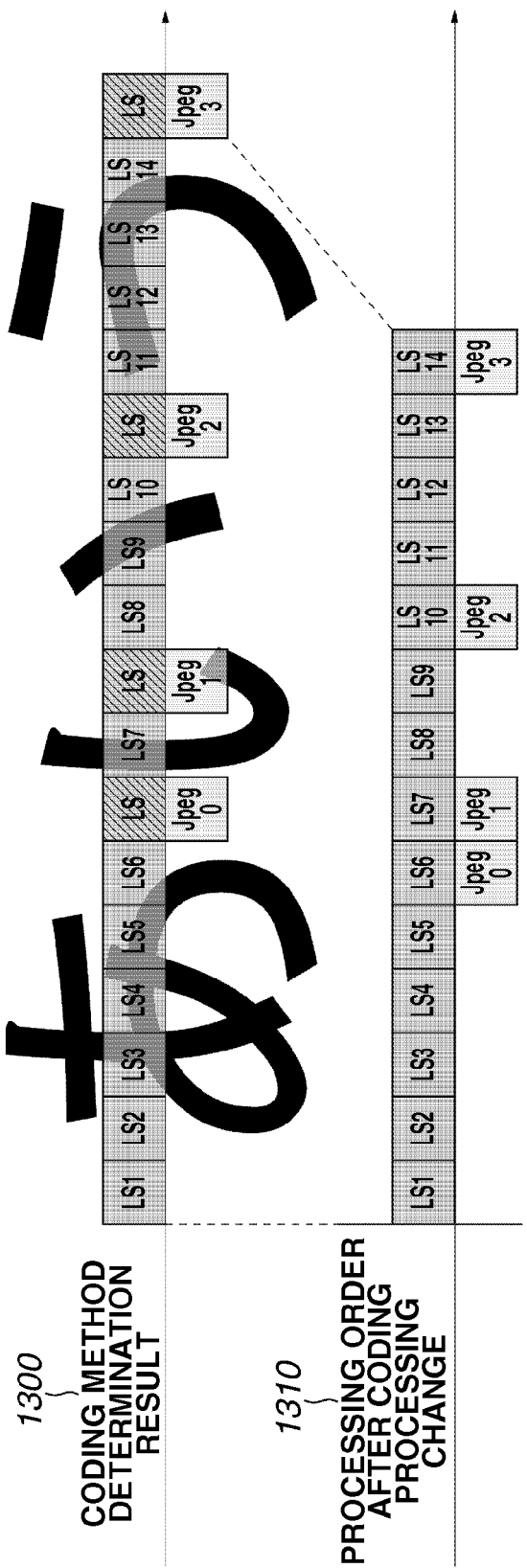
FIG. 13 is a timing chart illustrating an effect of performing parallel coding processing on an office document according to an exemplary embodiment of the present invention.

FIG. 13 illustrates a case in which document data produced using a word processor is coded. A coding method determination result 1300 is decided as illustrated in the upper portion of FIG. 13. For example, the image coding method determination unit 1111 determines that although the white (background) data behind a LS6 portion is determined as shown in LS (hatched portion), the determination result for this LS (hatched portion) is changed to a JPEG 0 portion, and the LS6 portion is input to the second coding unit 403 (JPEG-LS compression circuit). Then, the image coding processing control unit 1020 immediately inputs the white (background) data into the first coding unit 402 (JPEG circuit) as the JPEG 0 portion, thereby enabling parallelism to be increased. If this is performed for an A4 600 dpi 10 pt character document, in the example illustrated in FIG. 13, the region in which parallel operation is performed is 10% or more per page.

Figure 14:
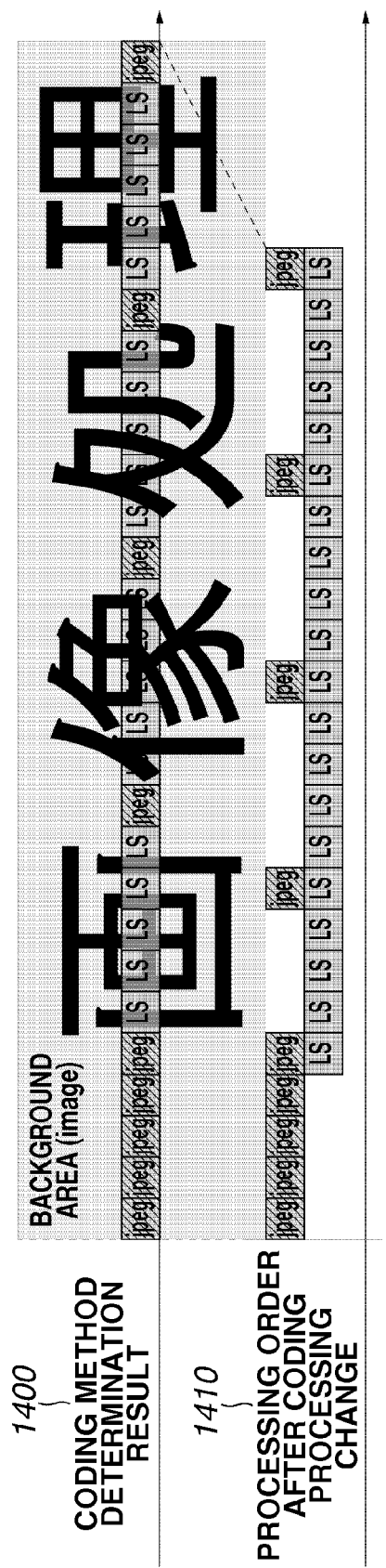
FIG. 14 is a timing chart illustrating an effect of performing parallel coding processing on slide data according to an exemplary embodiment of the present invention.

FIG. 14 illustrates a case in which a unique image is arranged in the predicted background for a presentation slide, and character information is also included. In such a case, a coding determination result 1400 is decided to be JPEG-DCT compression ("jpeg" in FIG. 14) between the characters. Consequently, even without switching the determination result, the coding processing order is as illustrated by the reference numeral 1410, so that a parallel operation can be performed. However, if an image produced as a computer graphic is used for the background image, the location determined as "jpeg" in FIG. 14 will be determined as a single color, so that the coding method can be changed to "LS".

Figure 15:
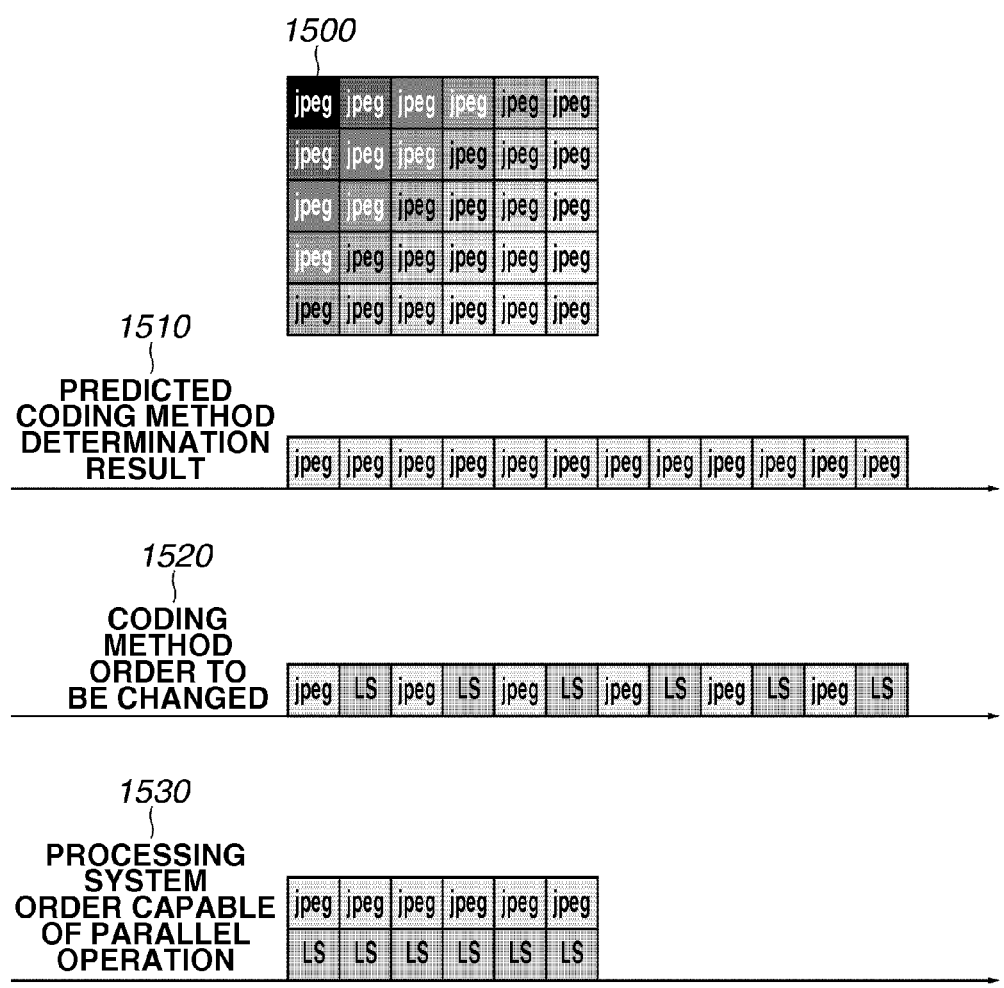
FIG. 15 illustrates a method for increasing the coding speed for a natural image according to an exemplary embodiment of the present invention.

Next, as illustrated in the image 1500 in FIG. 15, the compression of data entirely formed from a picture image, such as a natural image, will be described. For such an image, if it determined that the data is only configured of a single color, as illustrated in FIG. 15, the determination results 1510 of the compression method will all be "jpeg". To perform the processing more quickly, the user may wish to change the determination results so that they are in an order indicated by reference numeral 1520, and perform an operation in an order indicated by reference numeral 1530. However, if the coding method is switched between lossless and lossy compression for each block in a natural image, image quality can be affected. In such a case, the system may be configured so that the conditions for switching the coding pre-determination result by the input data analysis unit 1010 can be set. For example, if PDL printing is performed, the image data received from the PDL is usually compressed into data having a low resolution. Then, when rendering with the rendering unit, the enlargement processing is usually performed based on the printing resolution.

Figure 16:
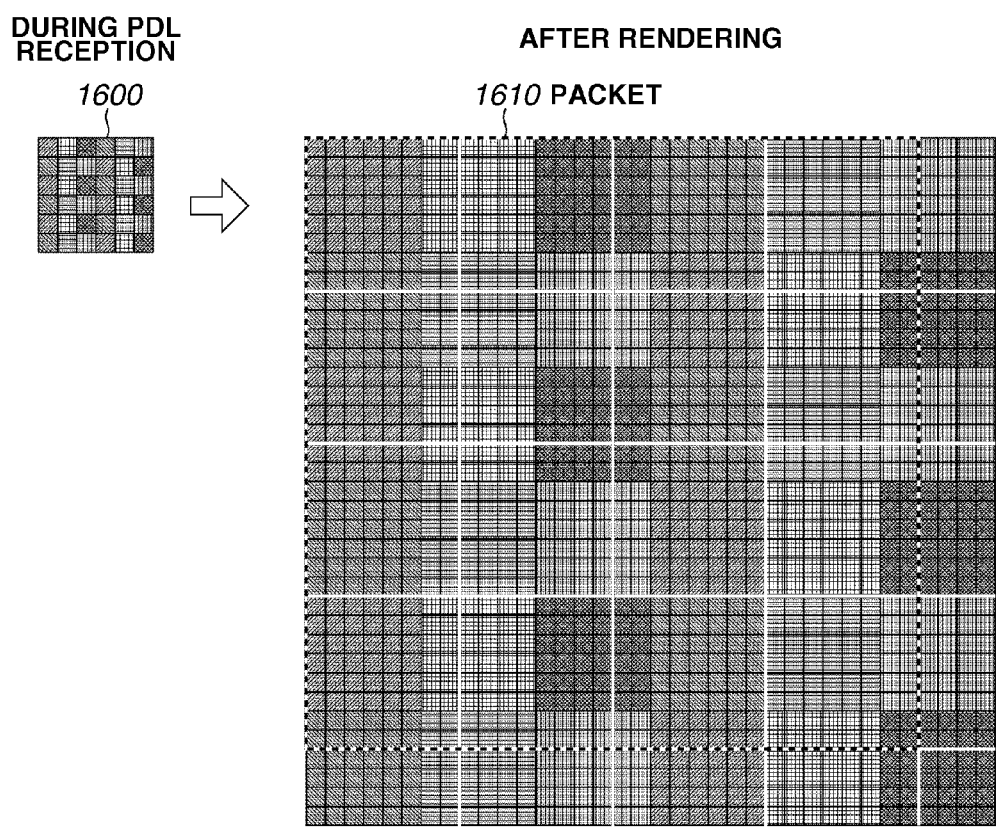
FIG. 16 is a pixel configuration diagram after rendering was performed on a natural image included in PDL data according to an exemplary embodiment of the present invention.

Therefore, as illustrated in FIG. 16, when printing a 100 dpi PDL received image 1600 at 600 dpi, in each 8×8 pixel region in a packet unit 1610 (portion enclosed by the dotted line), many color types will not be present (e.g., only 2 or 3 colors will be present). In this case, the rendering unit 200 can determine that the color number is low based on the enlargement ratio of the image specified in the display list received from the PDL rasterization unit (CPU) 101 and the image coding minimum pixel unit (e.g., for JPEG compression, 8×8 pixels). The reason for this is because for enlargement by 4-fold or more, an 8×8 pixel block will have a low color number even after enlargement, so that the rendering unit 200 will determine that this post-enlargement pixel block is a single color. Therefore, attribute information indicating that the coding method can be changed to lossless compression is added to this enlarged pixel block. Consequently, the pre-determination result can also be changed by the image coding processing control unit 1020 during coding. For example, the coding method for one packet from among ten packets can be changed. In addition, the color number of the image coding minimum pixel unit can also be calculated based on the pixel position and the enlargement pixel number to be rendered. Moreover, by providing an "image quality priority mode" and a "speed priority mode" in the operation unit 105, when the mode instruction from the user is "speed priority mode", even if data is not a single color, the data can be determined as a single color based on a single color determination condition.

In the present exemplary embodiment, in a method that can determine in advance an appropriate image coding method, system performance can be improved by increasing the duration that two types of image coding circuit are simultaneously operated.

Figure 17:
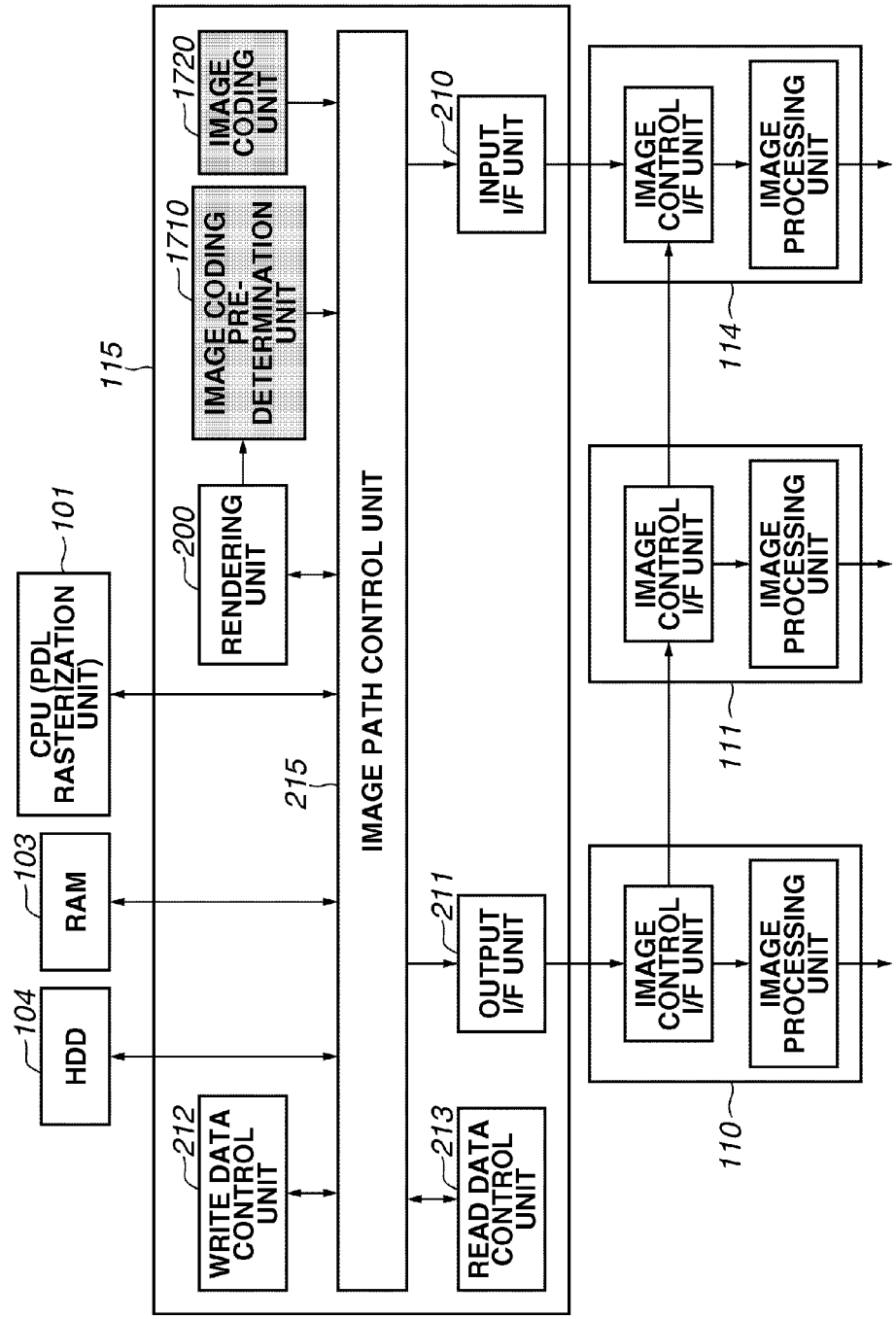
FIG. 17 illustrates an image control unit in a high-speed system according to an exemplary embodiment of the present invention.

Next, as a second exemplary embodiment, an image coding system will be described that is even faster than the first exemplary embodiment due to the use of DMA transfer. In the above-described system configuration, the output data control unit 1114 of the image coding unit 1100 receives the coded data output from two coding circuits, and transfers the coded data to the RAM 103 or the HDD 104 based on the order in which the data forms the image. If the same coding method is successively applied, the duration that the coding circuits can be operated in parallel decreases. Therefore, as illustrated in FIG. 17, an even faster system is realized by employing a configuration in which the image compression unit 201 in the system of the first exemplary embodiment is split into an image coding pre-determination unit 1710 and an image coding unit 1720.

Figure 18:
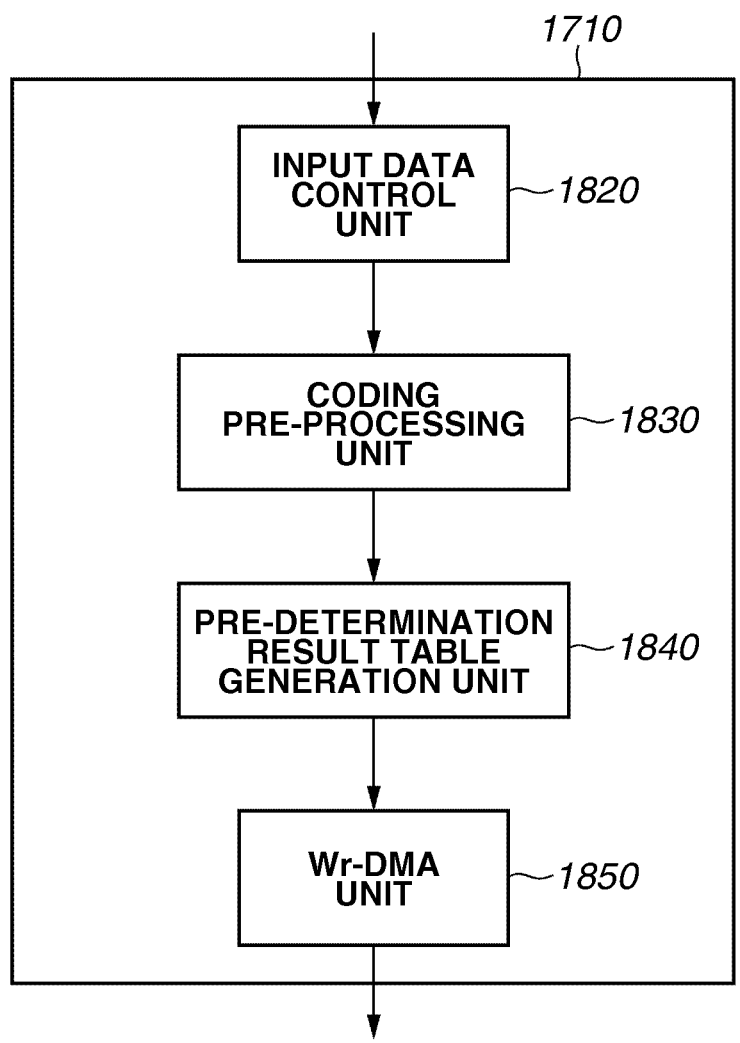
FIG. 18 illustrates an image coding pre-determination unit in a high-speed system according to an exemplary embodiment of the present invention.
Figure 19:
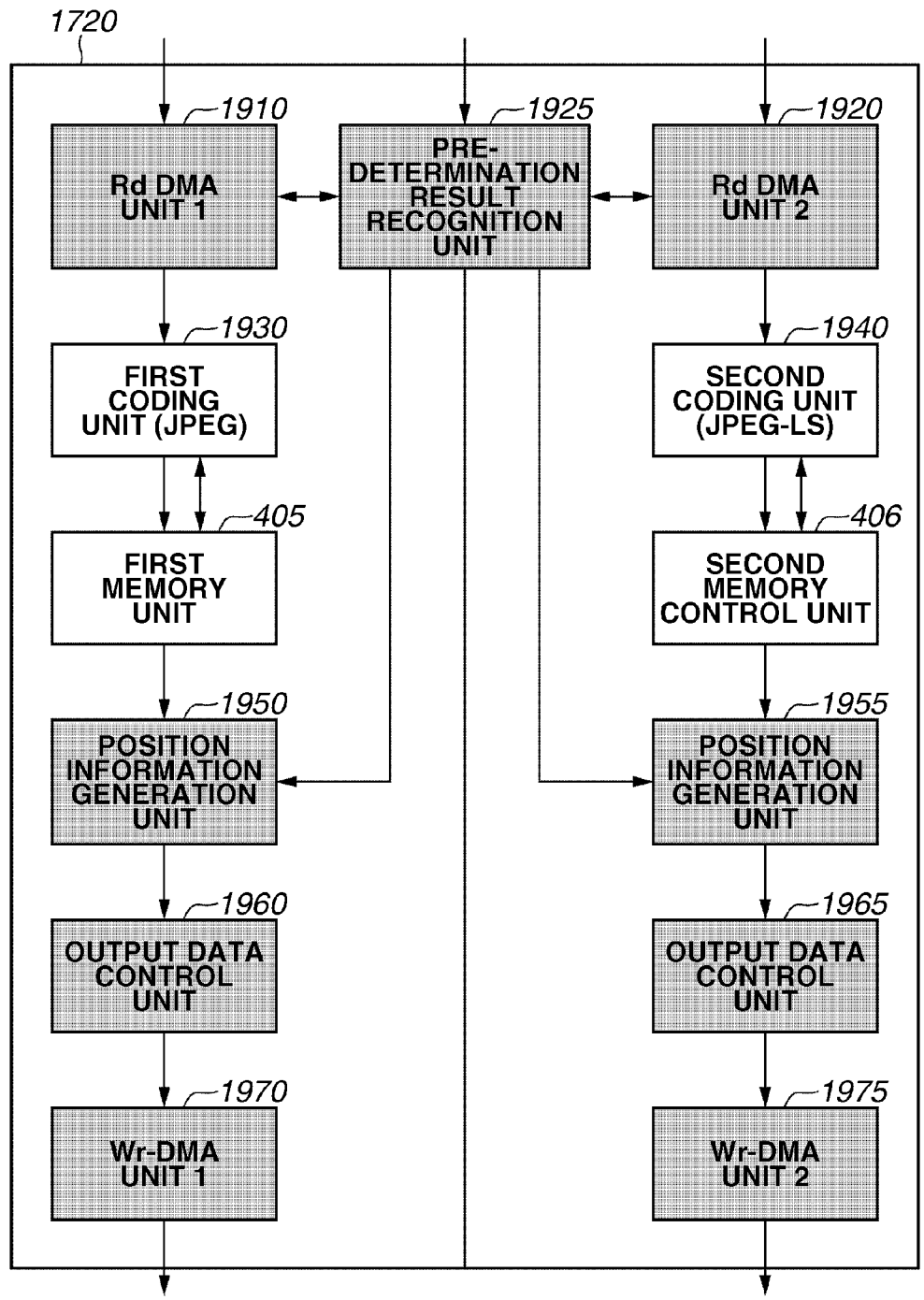
FIG. 19 illustrates an image coding unit in a high-speed system according to an exemplary embodiment of the present invention.

FIG. 18 illustrates the image coding pre-determination unit 1710 in detail. An input data control unit 1820 receives a raster image output from a rendering unit. A coding pre-processing unit 1830 determines which of the two coding methods to select, and generates coded data (hereinafter, "intermediate coded data"). A pre-determination result table generation unit 1840 produces a table from a list of pre-determination results for the coding method. A Wr-DMA unit 1850 writes the intermediate coded data and the pre-determination result table into a memory, and controls the write notification for writing into the image coding unit 1720 and the linkage operation. FIG. 19 is a block configuration diagram in which the image coding unit 1720 is split into first and second coding units. Since there is only one of the above-described pre-determination result tables, the image coding unit 1720 is controlled using a shared pre-determination result recognition unit 1925. First and second Rd-DMA units (1910 and 1920) receive notification from the Wr-DMA unit 1850 of the completion of writing, and then make the pre-determination result recognition unit 1925 read the pre-determination result table. Then, a first coding unit 1930 and a second coding unit 1940, which are coding circuits, are operated. At this point, the pre-determination result recognition unit 1925 can also determine the above-described input data characteristic (processing of steps S904 and S905), and based on the operation state of the coding circuits 1930 and 1940, dynamically change the Rd-DMA unit (1910 or 1920) that is operated. After coding, position information generation units 1950 and 1955 generate information about the position on the image of the coded data. Output data control units 1960 and 1965 generate the above-described packet header portion and packet data table information, and transfer the generated data to first and second Wr-DMA units (1970 and 1965).

Figure 20:
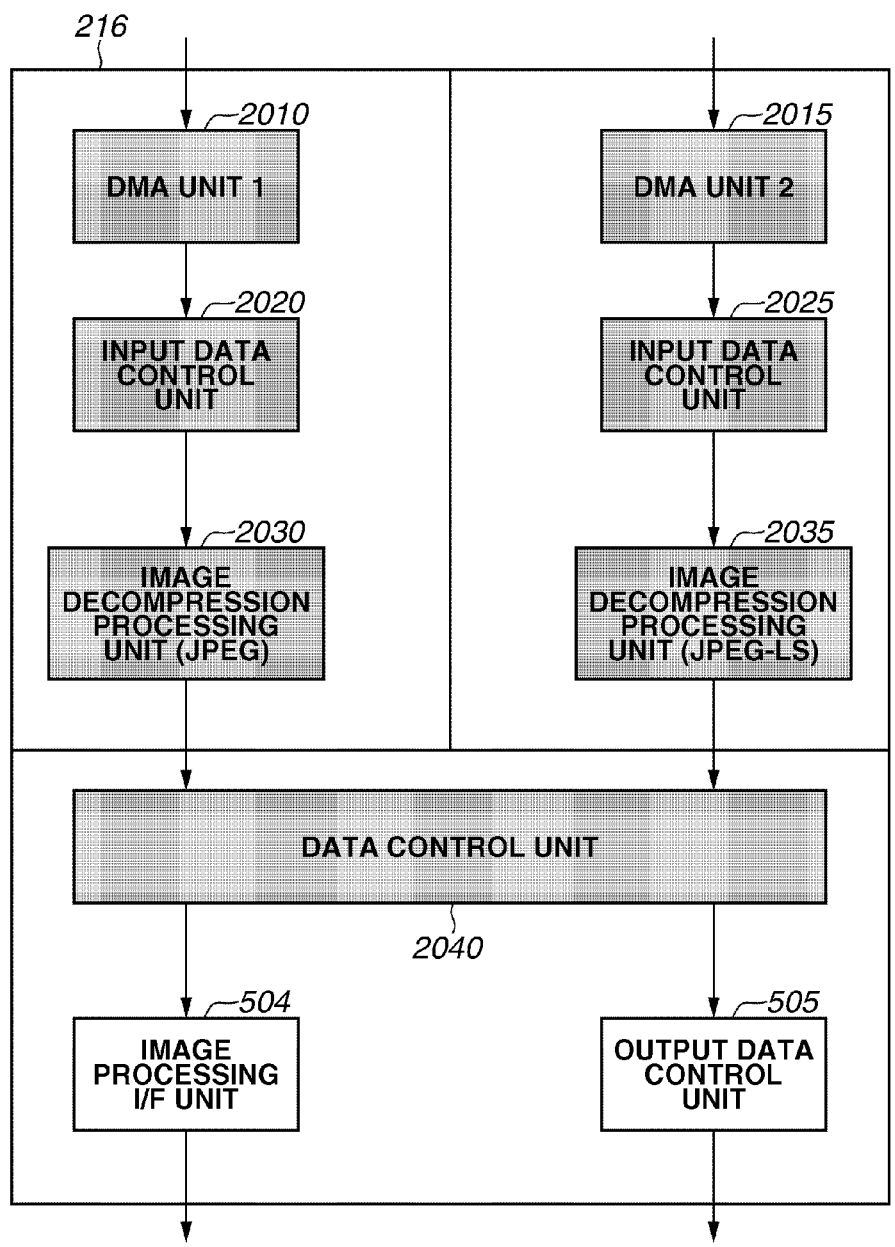
FIG. 20 illustrates an image decoding unit in a high-speed system according to an exemplary embodiment of the present invention.

FIG. 20 illustrates the image control I/F unit 216, which is a block common to the image processing units (110, 111, and 114). DMA units 2010 and 2015 specify the packet data to be read by referring to a list of the packet data table information generated by the output data control units 1960 and 1965. Input data control units 2020 and 2025 split the packet data into the minimum unit for coding, set the operation mode of the image decoding units 2030 and 2035, and transfer the decoded data. The output data is transferred to a buffer in a data control unit 2040, and control to return the image order to the raster order is performed.

Figure 21:
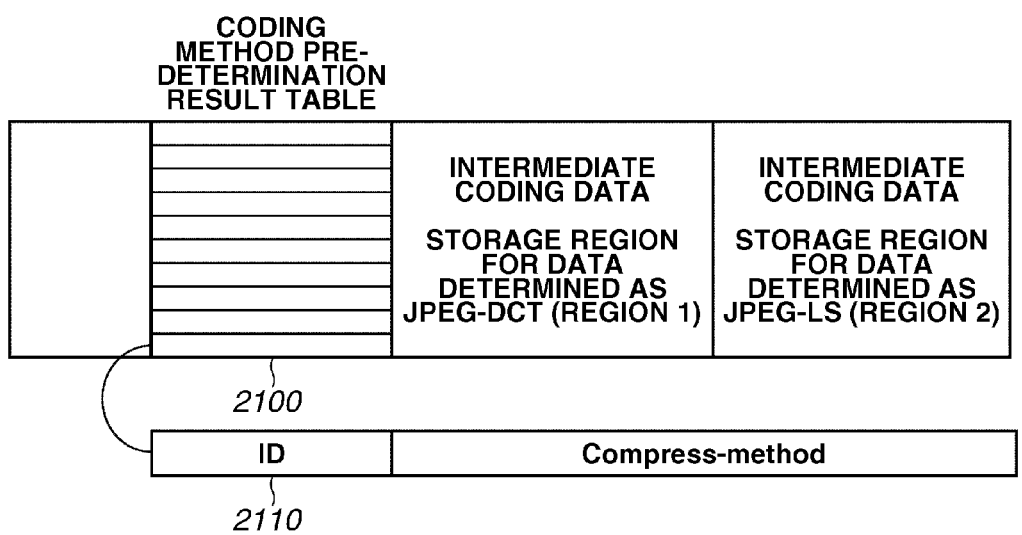
FIG. 21 illustrates a RAM storage format of a pre-determination result table and intermediate coded data in a high-speed system according to an exemplary embodiment of the present invention.

FIG. 21 illustrates a storage format 2100 of intermediate coded data in the RAM 103. The data is formed from a coding method pre-determination result table and intermediate coded data. The intermediate coded data is stored by further splitting it into JPEG and JPEG-LS data. Naturally, based on the coding circuit operation state, the second Rd-DMA unit for JPEG-LS data can read data from a JPEG region. Therefore, the intermediate coded data may be stored in order of blocks for one page. A coding method pre-determination result table 2110 is obtained by forming packet identification (ID) and the coding method into a table. This coding method pre-determination result table 2110 is read by the first and second Rd-DMA units of FIG. 19.

FIG. 22 illustrates a storage format 2200 of coded data in the RAM 103 and the HDD 104. The storage format 2200 is configured of a JPEG data group table, a JPEG-LS data group table, and JPEG/JPEG-LS coded data. Further, each piece of data in the JPEG data group table is formed from information about the position on the image of each packet and the address information stored in each packet. The data control unit 2040 in the image control I/F unit 216 uses this position information to restore the order of the data split into regions on the RAM 103 during coding.

FIG. 23, which includes FIGS. 23A and 23B, illustrates an operation flow of the respective blocks illustrated in FIGS. 18 to 20. In step S2301, the image coding pre-determination unit 1710 performs pre-determination image processing. In step S2302, the image coding pre-determination unit 1710 generates a determination result and the coding method pre-determination result table illustrated in FIG. 21. In step S2303, the image coding pre-determination unit 1710 issues an instruction to write the generated table into a memory. Based on this step S2303, the Wr-DMA unit stores the table data and the intermediate coding data in the RAM 103. When the writing is finished, the Wr-DMA unit notifies the image coding unit 1720. In step S2320, the pre-determination result recognition unit 1930 is started up.

In step S2321, the pre-determination result recognition unit 1925 reads the pre-determination result, in step S903, reads the input data type, and in step S1258, determines the coding method in the same manner as in the flow of steps S904 and S905. In step S2322, based on the determined coding method, an instruction to operate the Rd-DMA unit is issued. In steps S2330 and S2340, the first coding unit 1930/second coding unit 1940 that received the operation instruction is respectively started. In S2331 and S2341, these units read the intermediate coding data. In steps S2332 and 2342, the first coding unit 1930 and the second coding unit 1940 perform image coding. Then, in steps S2333 and 2343, the first coding unit 1930 and the second coding unit 1940 generate position information, a header, and table information. In steps S2334 and S2344, the first coding unit 1930 and the second coding unit 1940 write the generated data into the respective DMA write region.

After a one page amount of the coded packet data has been rasterized on the RAM 103, based on an instruction to start decoding (start image processing) from the CPU 101, in steps S2360 and S2370, first and second decoding units are started. In step S2380, the data control unit is started. In steps S2361 and S2371, the Rd-DMA unit determines the packet data to be read from the region in which the table information for the respective coding method is stored. In steps S2362 and S2372, the Rd-DMA unit reads the data. Then, in steps S2363 and S2373, the Rd-DMA unit performs image decoding, and in steps S2364 and S2374, notifies the data control unit that the decompression processing is finished. Then, in step S2381, the data control unit 2040 controls the order of the decoded data output from the first and second decoding units so that the decoded data is aligned in the raster order. Then, in step S2382, the data control unit 2040 determines the operation mode. Based on the determined operation mode, the processing proceeds to either step S2383 or S2384. In step S2383, the data control unit 2040 transfers the data to an image processing circuit. Alternatively, in step S2384, the data control unit 2040 transfers the data to another image processing unit.

According to the above system configuration, during image coding, to rasterize a coding pre-determination result in the RAM 103, the determination results for a whole page can be reallocated so that two types of coding method are evenly balanced. By performing such a control, performance can be improved even further.

In the second exemplary embodiment, the pre-determination results for a whole page generated by pre-determination are formed into a table, and temporarily stored in a memory along with intermediate coded data. This enables equalizing of the determination results for the whole page, so that two coding circuits can be independently operated. Consequently, the parallelism of circuits for a lossless compression method and a lossy compression method can be further increased.

Thus, in a method that can determine in advance an appropriate image coding method, system performance can be improved by increasing the duration that two types of image coding circuit are simultaneously operated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-023200 filed Feb. 4, 2010, which is hereby incorporated by reference herein in its entirety.

What is claimed is:

1. An image processing apparatus for performing image coding by a lossless compression unit and a lossy compression unit, the apparatus comprising:

an image coding pre-determination unit configured to perform a determination to select either one of the lossless compression unit and the lossy compression unit in coding pre-processing of an image;

a data analysis unit configured to determine whether a color number for a pixel block of the image is single; and a coding unit configured to, when it is determined by the data analysis unit that the color number is not single, perform coding on the pixel block with the compression unit determined by the image coding pre-determination unit, wherein when it is determined by the data analysis unit that the color number is single, and it is determined that the compression unit determined by the image coding pre-determination unit is in an operational state to perform coding on a previous pixel block preceding the pixel block by one block, a determination result by the image coding pre-determination unit is changed and the coding unit performs coding on the pixel block with the other compression unit than the compression unit determined by the image coding pre-determination unit, and when it is determined by the data analysis unit that the color number is single, and it is determined that the compression unit determined by the image coding pre-determination unit is not in an operational state to perform coding on a previous pixel block preceding the pixel block by one block, the coding unit performs coding on the pixel block with the compression unit determined by the image coding pre-determination unit.

2. The image processing apparatus according to claim 1, further comprising an instruction unit configured to give an instruction as to a color number determination condition for the data analysis unit as a speed priority mode and an image quality priority mode.

3. The image processing apparatus according to claim 1, wherein the image is a rendered image, in which the pixel block is determined as a single color based on an enlargement ratio in the rendering.

4. An image forming apparatus, wherein the image coding pre-determination unit according to claim 1 is configured to determine a color number of the pixel block, and select either one of the lossless compression unit and the lossy compression unit based on the determination result.

5. The image forming apparatus according to claim 4, further comprising a unit configured to set a determination condition for determining the color number.

* * * * *